United States Patent
Waligorski et al.

(10) Patent No.: US 10,061,029 B2
(45) Date of Patent: Aug. 28, 2018

(54) CORRECTION OF DEPTH IMAGES FROM T-O-F 3D CAMERA WITH ELECTRONIC-ROLLING-SHUTTER FOR LIGHT MODULATION CHANGES TAKING PLACE DURING LIGHT INTEGRATION

(71) Applicants: Gregory Waligorski, Redondo Beach, CA (US); Ilia Ovsiannikov, Studio City, CA (US); Yong-Hwa Park, Suwon-si (KR)

(72) Inventors: Gregory Waligorski, Redondo Beach, CA (US); Ilia Ovsiannikov, Studio City, CA (US); Yong-Hwa Park, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 377 days.

(21) Appl. No.: 14/883,598

(22) Filed: Oct. 14, 2015

(65) Prior Publication Data

US 2016/0198147 A1 Jul. 7, 2016

Related U.S. Application Data

(60) Provisional application No. 62/100,464, filed on Jan. 6, 2015.

(51) Int. Cl.
| | |
|---|---|
| *G01S 17/89* | (2006.01) |
| *G01S 17/36* | (2006.01) |
| *G01S 7/481* | (2006.01) |
| *G01S 7/491* | (2006.01) |

(52) U.S. Cl.
CPC ............ *G01S 17/89* (2013.01); *G01S 7/4816* (2013.01); *G01S 7/4914* (2013.01); *G01S 17/36* (2013.01)

(58) Field of Classification Search
CPC ........ G01S 17/08; G01S 17/107; G01S 17/89; G01C 3/08
See application file for complete search history.

(56) References Cited

U.S. PATENT DOCUMENTS

| | | | |
|---|---|---|---|
| 6,925,195 B2 | 8/2005 | Cahill et al. | |
| 2009/0091738 A1* | 4/2009 | Morcom | G01S 17/08 356/5.03 |
| 2013/0038722 A1 | 2/2013 | Ha et al. | |
| 2013/0101176 A1 | 4/2013 | Park et al. | |

\* cited by examiner

*Primary Examiner* — Luke D Ratcliffe
(74) *Attorney, Agent, or Firm* — Renaissance IP Law Group LLP

(57) ABSTRACT

In embodiments, a T-O-F depth imaging device renders a depth image of an object that has corrected depth values. The device includes a pixel array that uses an Electronic Rolling Shutter scheme. The device also includes a light source that transmits towards the object light that is modulated at an operating frequency, and an optical shutter that opens and closes at the operating frequency. The optical shutter further modulates the light that is reflected from the object, before it reaches the pixel array. The transmission of the light and the operation of the shutter change phase relative to each other while at least one of the pixels is sensing the light it receives, which permits a faster frame rate. Depth is determined by the amount of light sensed by the pixels, and a correction is computed to compensate for the changing phase.

22 Claims, 25 Drawing Sheets

COMPONENTS SALIENT FOR DEPTH IMAGING

EQ. (5-1) $\quad A(row, col) = \dfrac{\sqrt{(A_{270} - A_{90})^2 + (A_{180} - A_0)^2}}{2}$ EQ. (5-2) $\quad B(row, col) = \dfrac{A_0 + A_{90} + A_{180} + A_{270}}{4}$ EQ. (5-3) $\quad \varphi(row, col) = \arctan \dfrac{A_{270} - A_{90}}{A_{180} - A_0}$ EQ. (5-4) $\quad \sigma(row, col) = \dfrac{\sqrt{B(row, col)}}{A(row, col) * \sqrt{2}}$

*EQUATIONS FOR COMPUTING DEPTH*

FIG. 5 (PRIOR ART)

*EXPOSURES FOR DEPTH IMAGING USING ELECTRONIC GLOBAL SHUTTER MODE*

*EXPOSURES FOR DEPTH IMAGING USING ELECTRONIC ROLLING SHUTTER MODE, PHASE TRANSITION, & CORRECTION APPLIED*

EQ. (9-1)    $w(row) = \dfrac{\text{row position \#}}{N_{ROWS}}$

EQ. (9-2)    $\alpha(row) = \arctan \dfrac{1 - w(row)}{w(row)}$

EQ. (9-3)    $\varphi_{ERS}(row, col) = \varphi(row, col) - \alpha(row)$

EQ. (9-4)    $\sigma_{ERS}(row, col) = \dfrac{\sqrt{B(row, col)}}{A(row, col) * \sqrt{2} * \sqrt{(1-w)^2 + w^2}}$

*EQUATIONS FOR COMPUTING CORRECTED DEPTH – ELECTRONIC ROLLING SHUTTER*

FIG. 9

```
w=0:0.01:1;
alpha=atan2(w,1-w);
plot(w,alpha/pi/2*360)
```

*CODE FOR PLOTTING ROW-DEPENDENT DEPTH CORRECTION*

*ROW-DEPENDENT DEPTH CORRECTION* w=0:0.01:1;
plot(w,1./sqrt((1-w).^2+w.^2))
FIG. 11A  *CODE FOR DEPTH ERROR CHANGE*
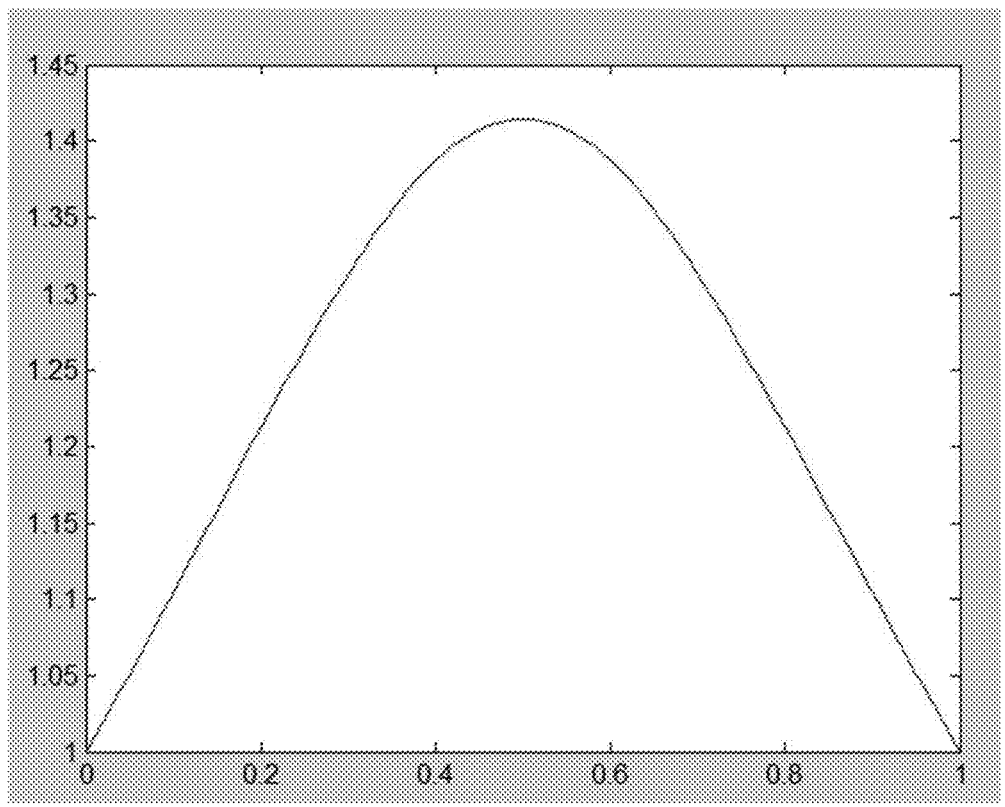
FIG. 11B  *IMPROVEMENT IN DEPTH ERROR*

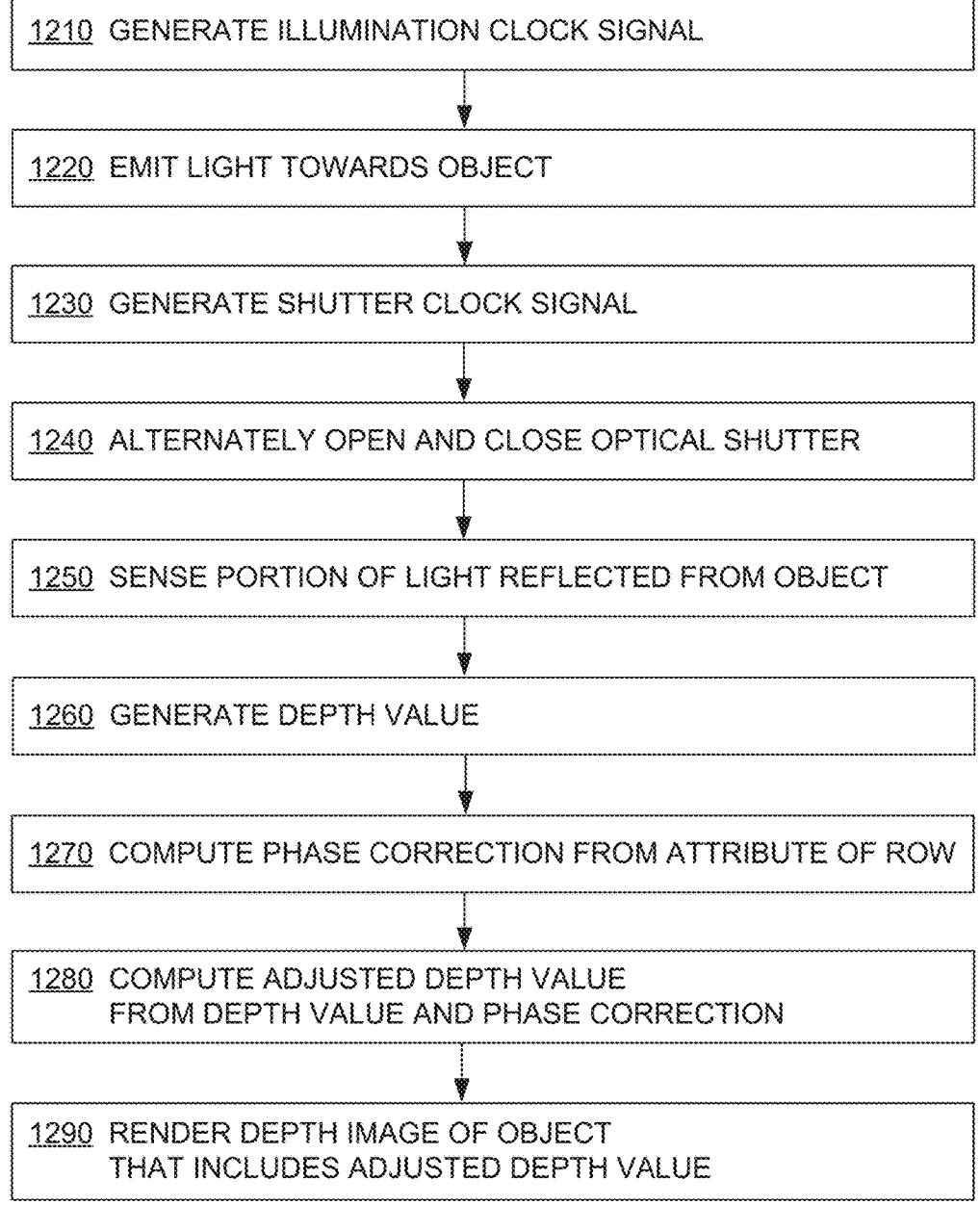
FIG. 12       *METHODS*

[I+2]

EQ. (19-1)  $A_{180(I+2)\ W/\ MOTION} = A_{180(I+2)} + \varepsilon$

EQ. (19-2)  $A_{270(I+2)\ W/\ MOTION} = A_{270(I+2)} + \varepsilon$

EQ. (19-3)  $\varphi_{(I+2)\ W/\ MOTION} = \arctan \dfrac{A_{270(I+2)\ W/\ MOTION} - A_{90(I+2)}}{A_{180(I+2)\ W/\ MOTION} - A_{0(I+2)}}$ EQ. (19-4)  $\varphi_{(I+2)\ W/\ MOTION} = \arctan \dfrac{A_{270(I+2)} - A_{90(I+2)} \boxed{+\varepsilon}}{A_{180(I+2)} - A_{0(I+2)} \boxed{+\varepsilon}}$

— 1888

[I+3]

EQ. (19-5)  $A_{0(I+3)\ W/\ MOTION} = A_{0(I+3)} + \varepsilon$

EQ. (19-6)  $A_{90(I+3)\ W/\ MOTION} = A_{90(I+3)} + \varepsilon$

EQ. (19-7)  $\varphi_{(I+2)\ W/\ MOTION} = \arctan \dfrac{A_{270(I+3)} - A_{90(I+3)\ W/\ MOTION}}{A_{180(I+3)} - A_{0(I+3)\ W/\ MOTION}}$ EQ. (19-8)  $\varphi_{(I+2)\ W/\ MOTION} = \arctan \dfrac{A_{270(I+3)} - A_{90(I+3)} \boxed{-\varepsilon}}{A_{180(I+3)} - A_{0(I+3)} \boxed{-\varepsilon}}$

*DISCOVERED REASON FOR DISCONTINUITY ("BLINKING") BETWEEN SUCCESSIVE RENDERED DEPTH FRAMES*

FIG. 19

COMPONENTS SALIENT
FOR DEPTH IMAGING

*DEPTH COMPUTED WITH NON-COINCIDENT CORRECTION*

*DEPTH COMPUTED WITH NON-COINCIDENT CORRECTION*

DEPTH COMPUTED WITH NON-COINCIDENT CORRECTION

| Ordinal number of depth data capture cycle (i is an arbitrary integer, e.g. i = 0) | i + 0 | | | | i + 1 | | | |
|---|---|---|---|---|---|---|---|---|
| Signal integration phase | 270 | 0 | 90 | 180 | 270 | 0 | 90 | 180 |
| Integrated signal (or raw image consisting of values of this signal read from different pixels) | A270(i+0) | A0(i+1) | A90(i+1) | A180(i+1) | A270(i+1) | | | |
| 1st "coincidence-corrected" signal (or image composed of values of this signal) | 1/4*A90(i+0)+ 3/4*A90(i+1) | 1/4*A180(i+0)+ 3/4*A180(i+1) | 1/4*A270(i+0)+ 3/4*A270(i+1) | 1/4*A0(i+1)+ 3/4*A0(i+2) | | | | |
| 2nd "coincidence-corrected" signal (or image composed of values of this signal) | 1/2*A90(i+0)+ 1/2*A90(i+1) | 1/2*A180(i+0)+ 1/2*A180(i+1) | 1/2*A270(i+0)+ 1/2*A270(i+1) | 1/2*A0(i+1)+ 1/2*A0(i+2) | 1/2*A90(i+1)+ 1/2*A90(i+2) | | | |
| 3rd "coincidence-corrected" signal (or image composed of values of this signal) | 3/4*A180(i+0)+ 1/4*A180(i+1) | 3/4*A270(i+0)+ 1/4*A270(i+1) | 3/4*A0(i+1)+ 1/4*A0(i+2) | 3/4*A90(i+1)+ 1/4*A90(i+2) | 3/4*A180(i+1)+ 1/4*A180(i+2) | | | |
| Ordinal number of depth (or depth image) computed from 4 signals (or images; 3 corrected, 1 not) listed above (j is an arbitrary integer, e.g. j = 0) | j + 0 | j + 1 | j + 2 | j + 3 | j + 4 | | | |

FIG. 24

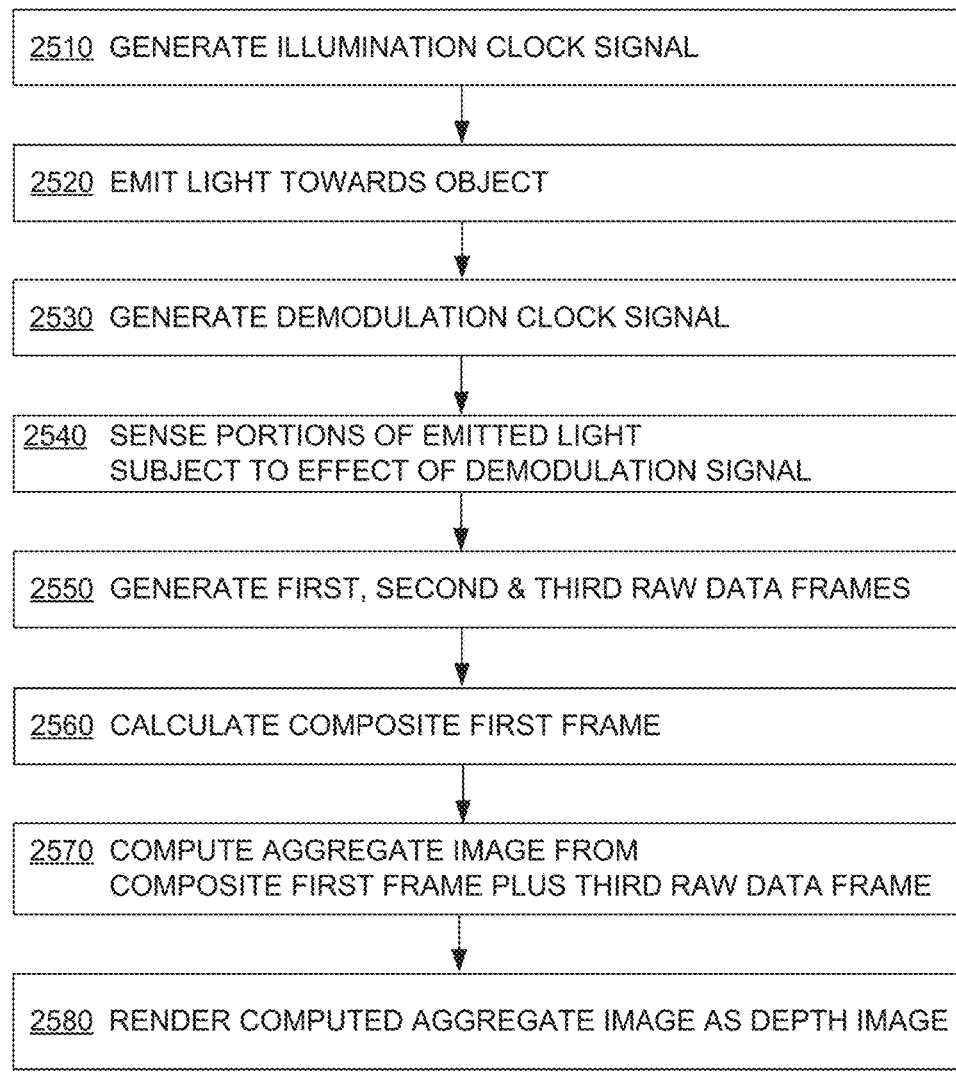
FIG. 25      *METHODS*

CORRECTION OF DEPTH IMAGES FROM T-O-F 3D CAMERA WITH ELECTRONIC-ROLLING-SHUTTER FOR LIGHT MODULATION CHANGES TAKING PLACE DURING LIGHT INTEGRATION

CROSS REFERENCE TO RELATED PATENT APPLICATIONS

This patent application claims priority from U.S. Provisional Patent Application Ser. No. 62/100,464, filed on Jan. 6, 2015, the disclosure of which is hereby incorporated by reference.

BACKGROUND

Ranging devices are used for range sensing, i.e. measuring distances from these devices to objects or persons. Range sensing is also known as ranging, distance sensing or depth sensing. Certain ranging devices, sometimes referred to as imaging range sensors, can perform simultaneously multiple distance measurements in different directions within a certain solid angle or field of view (FOV). A set of distance values measured in this way can be converted into a 3-dimensional (3D) image of objects present in the FOV. This is why descriptions of imaging range sensors often resemble descriptions of more traditional cameras, producing 2-dimensional (2D) images that are relatively less informative about the shapes of imaged objects and more about their other properties, like color and reflectivity. Information provided by a traditional camera can be combined with distance data from a ranging device imaging the same FOV, to create color 3D images of objects or for other purposes. Cameras able to sense distances to objects simultaneously with the intensity and color of light coming from the objects are also known in the art.

Most of modern imaging devices use arrays of microscopic light sensors to capture images, i.e. patterns of light, produced by lenses, mirrors or similar optical, light-gathering components. Each individual light sensor, also known as a pixel, responds to light directed onto it by the optical component, the light that ultimately comes from a certain narrow solid angle within the field of view (FOV) of the optical component. This narrow solid angle can be called the acceptance angle or FOV of the pixel. The FOV of an imaging device is simply a sum of the non-overlapping fields of view of all its active pixels. A pixel's response to light involves absorption of photons, resulting in generation of electrically charged photoelectrons that are then captured in a potential well. The charge accumulated in the well over a certain period of time called "integration time" or "exposure time" is ultimately converted, by dedicated electronic circuits located inside and/or outside the pixel, to a digital value that is read out of the imaging device, and can be stored in a digital memory. A set of such digital values, produced roughly simultaneously by different light-sensing pixels—and therefore representing contemporaneous values of light intensity at different points of the light pattern projected onto the pixel array of an imaging device—is called a digital image, with the individual digital values being called image pixels.

The traditional use of the word "pixel" (a contraction of "picture element") to signify both a basic component of a digital image and a microscopic light sensor in an imaging device often results in these two distinct concepts being confused—or, at least, being thought of as related in a very straightforward way. However, the relation between an array of light-sensing pixels and a digital image ultimately obtained from it can be quite complicated. A digital image consisting of simple "readings" of light intensity from different light-sensing pixels, and containing exactly one "reading" from each pixel, is only the simplest possibility, a data set often called a "raw image" or "raw frame". One such raw image or a batch of raw images read out sequentially from an imaging device can be subjected to digital processing that will, firstly, destroy the one-to-one correspondence between the pixels of the resulting image and the light-sensing pixels of the imaging device, and, secondly, make the image pixels represent something other than light intensity at different locations. A good example of the image processing that does both is the color interpolation or demosaicing that coverts raw images obtained from image sensors with color filters on their pixels (typically arranged in so-called Bayer pattern) to digital images in which each pixel is a three-component vector representing light intensity and color (or luminance and chrominance; luma and chroma for short). A ranging imaging device may use light-sensing pixels of the same design as a color image sensor, but its ultimate output is images consisting not of luma-chroma vectors, but of distance data, obtained by processing raw pixel readouts in a different way than that used to produce digital color images. These distance data can be structured into so called depth images, in a raster or vector form. In a vector depth image, every image pixel can usually be expected to represent a direction and measured distance to some point on the surface of some object—in other words, the position of such a point in some coordinate system. In raster depth images, one should generally expect to find both pixels representing successful attempts to measure distance in specific directions and pixels representing failed attempts. The latter may be present due to, for example, the absence of sufficiently near and sufficiently reflective objects in certain parts of the ranging device's FOV.

Ranging is often performed using different time-of-flight (T-O-F) techniques. The most popular of these involves illuminating objects in the FOV of a ranging device with a beam of light of periodically modulated intensity, and having the ranging device capture a series of "samples" of reflected light intensity at different points of its modulation period. An "intensity sample" is actually an analog or digital signal proportional to a finite time integral of the product of the oscillating light intensity and a certain co-periodic "demodulation function" or "gating function". This demodulation function makes the integral representative of the light intensity at a certain point of—or within a certain fraction of—the intensity modulation period, by giving to that favored part of the period a higher weight in the integral than to the rest of the period. The higher the ratio of the weight of the favored part to the weight of the remainder of the period, (often referred to as demodulation contrast), the smaller the favored part of the period, and the lower the number of periods in the integration time, the more accurate the description of the integral as an intensity sample is. The description is completely accurate only in the ideal, unrealistic case when the demodulation function is a Dirac delta function. The first step away from this ideal is to repeat the sampling by the delta function at a specific modulation phase over a number of modulation periods, to improve the signal-to-noise ratio (SNR) of the resulting multi-period integral. This only works if the intensity modulation is constant and the intensity noise is random throughout the integration time. The situation does not change when the delta function is replaced by any demodulation function that is less extreme in giving unequal weights to different light modulation phases. The only effect of this change is to weaken the phase-specificity of any single- or multi-period integral of the product of the function and light intensity.

Intensity of the reflected light at the imaging device can be sampled at different phases of its oscillation by changing the phase difference between the demodulation function and known modulation of light intensity at the light source. The changing of this modulation-demodulation phase difference or shift can be done by changing the phase of the demodulation function or the phase of the light intensity modulation, whichever is most convenient. After collecting at least three light intensity samples, separated by sufficiently large phase shift intervals and having sufficient signal-to-noise ratios, one can determine, using computation methods known in the art, the modulation phase difference between the light reaching the ranging device and the light at its source. This phase difference is a result of the light having traveled a distance from the source to the ranging device. Up to a certain maximum distance, proportional to the light modulation period, the phase difference is proportional to the distance traveled by the light. If the source of the modulated light is close to the ranging device, a reflection of the light from any object into the ranging device results in a travel distance close to twice the distance from the device to the object. Thus, distances to different objects can be readily obtained from phase shifts of modulated light beams reflected from those objects.

For a demodulation function to be present in the light intensity integrals captured by a T-O-F ranging device, the device must include some demodulating component or demodulator, permitting the integration of modulated light over a certain fraction of every modulation period, and preventing or inhibiting the integration for the remainder of the period. An imaging range sensor may have pixels designed to perform both the demodulation and integration of the incident light. However, combining these two functions in very small pixels is difficult, which limits the spatial resolution of sensors with demodulating pixels. Moreover, the effectiveness of demodulation in CMOS pixels drops sharply if the inverse of the period of the demodulation function, called demodulation frequency, is pushed above 20 MHz.

Instead of using a specially designed sensor with demodulating pixels, a T-O-F 3D imaging device can use an ordinary image sensor with a separate demodulator, in the form of an optical gate or shutter whose transmission oscillates at a high frequency. The transmission of the shutter is the demodulation function in this case. This function can usually be considered "global", i.e. the same for all pixels of the sensor behind the shutter, at least in terms of having the same period and phase of oscillation, if not necessarily the same oscillation amplitude and midpoint. While the light input to all the pixels is controlled by the global demodulation function, the pixels generally do not have to integrate light in complete synchrony, i.e. start and end the integration all at the same time and integrate as much of the light input as permitted by the demodulation function. For example, different rows of pixels may start and end the integration at different times, while sharing the length of the integration time. This is equally possible for the demodulating pixels mentioned earlier. The usual reason for making the timing of light integration pixel-position-dependent or local in this way is to enable reading and outputting of the resulting pixel data at a steady, maximized data rate. When the timing of light integration in pixels is local, the demodulating pixels have an advantage over a global demodulator, in that the necessary changes in phase shifts of the pixels' demodulation functions can also have local timing, and it can be selected so that no local phase shift change ever coincides with light integration at the same location. The requirement to make this possible is to be able to change the phases of the demodulation functions of the pixels, while keeping the phase of the light intensity modulation constant.

Avoiding changes of demodulation function phase shift during light integration is necessary for the resulting intensity integral to be usable as a sample of light intensity at a certain phase of its modulation. Formulae for computing distance from 3 or 4 such "pure one-phase intensity samples" are simple, well known in the art, and widely used in T-O-F ranging systems. Also, analysis of noise or error propagation through these formulae is quite straightforward. All this makes light integration at a constant demodulation function phase shift preferable to other possibilities. However, holding on to this preference in an T-O-F depth imaging system combining a global demodulation function (provided, for instance, by an optical shutter) with a local light integration timing (e.g. the timing scheme known in the art as Electronic Rolling Shutter or ERS) may require an inefficient use of pixels, in the sense that successive light integrations in a particular pixel producing the "pure one-phase light intensity samples" may have to be separated by long periods of idle waiting for other pixels to complete their similar integrations. The integration timing being local implies that, for every light integration in a particular pixel, at least one integration takes place elsewhere that is of the same duration, and requires the same phase shift of the global demodulation function, but differs in terms of start time and end time. From this, it follows that the time intervals between changes of the demodulation function phase shift must be longer than the duration of any particular integration. These time intervals are also intervals between the starts of consecutive integrations in any particular pixel, because each of these integration should be done at a different demodulation function phase shift. If a pixel integrates light over significantly less than 100% of every interval between two consecutive integration starts, the pixel is used inefficiently.

Using an off-the-shelf ERS sensor behind a fast optical shutter in a T-O-F 3D camera has some advantages over using a specialized depth sensor with demodulating pixels. These advantages include lower sensor cost, smaller pixel size and higher pixel count, and will likely include in the future a higher maximum attainable modulation/demodulation frequency. A number of disadvantages of using an optical shutter or other global demodulator can also be listed. Some of the disadvantages are unique to the combination of a global demodulator with local integration timing exemplified by the integration timing in ERS sensors. The main disadvantage of this combination is its inability to produce raw frames consisting of "pure one-phase light intensity samples" at a maximum frame rate permitted by the ERS timing scheme. A high frame rate is a highly desirable characteristic of every T-O-F 3D camera that does sequential capture of light intensity samples, because the camera's ability to accurately image moving objects grows with the frame rate. A T-O-F camera with global demodulator can only capture intensity samples sequentially. Demodulating pixels can be designed and operated in a number of ways permitting every pixel to capture simultaneously 2 or more different-phase intensity samples. When the capture of different-phase intensity samples is partly or fully parallelized in demodulating pixels, a T-O-F 3D camera using these pixels usually images moving objects better than a camera using a fully sequential sample capture to produce depth images at the same frame rate. Correspondingly, there is more need to maximize the frame rate in T-O-F cameras with global demodulators, including those cameras that also use the ERS integration timing scheme.

BRIEF SUMMARY

The present description gives instances of depth imaging devices, systems, and methods, the use of which may help overcome problems and limitations of the prior art.

In embodiments, a T-O-F depth imaging device renders a depth image of an object that has corrected depth values. The device includes a pixel array that uses an Electronic Rolling Shutter (ERS) scheme. The device also includes a light source that transmits towards the object light that is modulated at an operating frequency, and an optical shutter that opens and closes at the operating frequency. The optical shutter further modulates the light that is reflected from the object, before it reaches the pixel array. The transmission of the light and the operation of the shutter change phase relative to each other while at least one of the pixels is sensing the light it receives, which permits a faster frame rate. Depth is determined by the amount of light sensed by the pixels, and a correction is computed to compensate for the changing phase.

Accordingly, embodiments provide a way to avoid the above-mentioned inefficiency in the use of pixels at T-O-F ranging systems using global demodulators and ordinary ERS image sensors.

In embodiments, a T-O-F depth imaging device performs corrections to T-O-F depth image frames rendered for an object. The device includes a pixel array and a light source that transmits towards the object light that is modulated at an operating frequency. The modulated light is reflected from the object and is sensed by the pixel array, which generates raw data frames for depth at different phases. At least one composite data frame is calculated from nonzero contributions of two of the raw data frames that are for similar phases, and an aggregate image is computed from at least the composite data frame plus possibly some of the raw data frames. Thus a blinking motion artifact between aggregate images can be reduced.

These and other features and advantages of this description will become more readily apparent from the Detailed Description, which proceeds with reference to the associated drawings in which:

BRIEF DESCRIPTION OF THE DRAWINGS

FIG. 5 shows known sample equations for computing depth.

FIG. 9 shows sample equations for computing corrected depth according to embodiments.

FIG. 11A shows a portion of Matlab code that can be used to plot a depth error change of the equations of FIG. 9 that result according to embodiments.

FIG. 11B shows a plot that has been generated by the code of FIG. 10A, and which demonstrates an improvement in the depth error that results from embodiments.

FIG. 12 is a flowchart for illustrating methods according to embodiments.

FIG. 19 shows equations developed by the inventors for further explaining the blinking in transitions of FIG. 18.

FIG. 24 is a table of frame labels that may be used according to embodiments.

FIG. 25 is a flowchart for illustrating methods according to embodiments.

DETAILED DESCRIPTION

As has been mentioned, the present description is about depth imaging devices, systems, and methods. Embodiments are now described in more detail.

Figure 1:
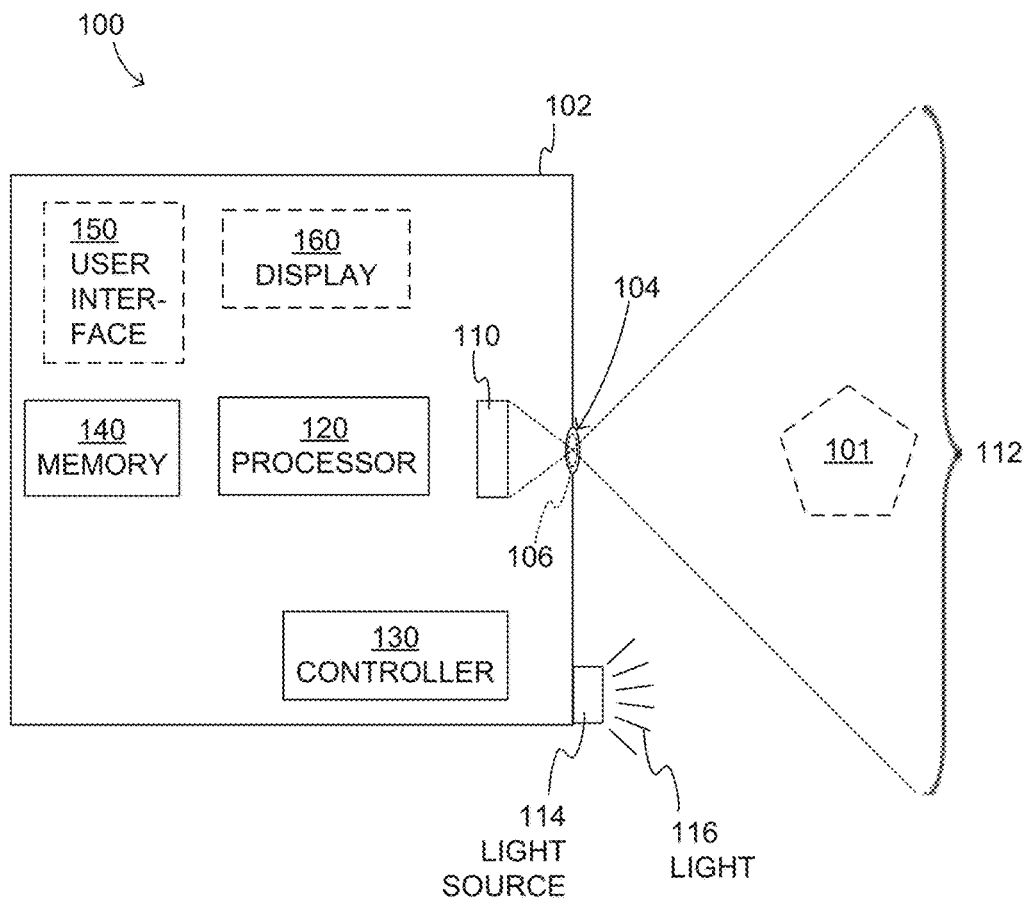
FIG. 1 is a block diagram of a sample device made according to embodiments.

FIG. 1 is a block diagram of a device 100, which can be implemented according to many different embodiments. For example, device 100 could be a depth imaging device that is configured to render a depth image of an object 101, or of a person. A "depth image" of an object is not an image in the regular sense, but is a way of presenting information about the distance (depth, or range) of various parts of the object from the camera. For another example, device 100 may be a regular imaging device such as a camera. In some embodiments, device 100 is both a depth imaging device and a regular imaging device, because such types of devices have commonalities that can be used synergistically.

Device 100 can have a casing 102 that can also be called housing. An opening 104 is provided in casing 102. A lens or another light focusing component 106 is provided in opening 104, unless the opening is a pinhole, making the component 106 unnecessary. Device 100 also has a pixel array 110. Pixel array 110 is configured to receive light through opening 104, and capture it. Accordingly, pixel array 110, opening 104 and lens 106 define a field of view 112. Of course, field of view 112 and object 101 are in three dimensions, while FIG. 1 shows them in two dimensions.

Casing 102 can be aligned, so that object 101, or a person or a scene as desired, will be brought within field of view 112, so that it presents an input image. A light source 114, such as a light emitting diode (LED) or a laser diode, may be further provided on casing 102, so as to assist in the imaging and/or enable ranging operation of device 100. Light source 114 can be configured to emit light 116 towards field of view 112, so as to illuminate persons and objects within it. Light 116 can be reflected by object 101 and then be received via opening 104, in addition to ambient light received by reflection from object 101. Accordingly, light source 114 can assist in imaging by illuminating object 101 better or can enable ranging by modulating the intensity of light 116 in a way that is already known to device 100. Light source 114 may be operating responsive to a drive signal, and thus it may modulate the intensity of emitted light 116 similarly to how the drive signal is modulated, as will be seen later in this document.

Figure 2:
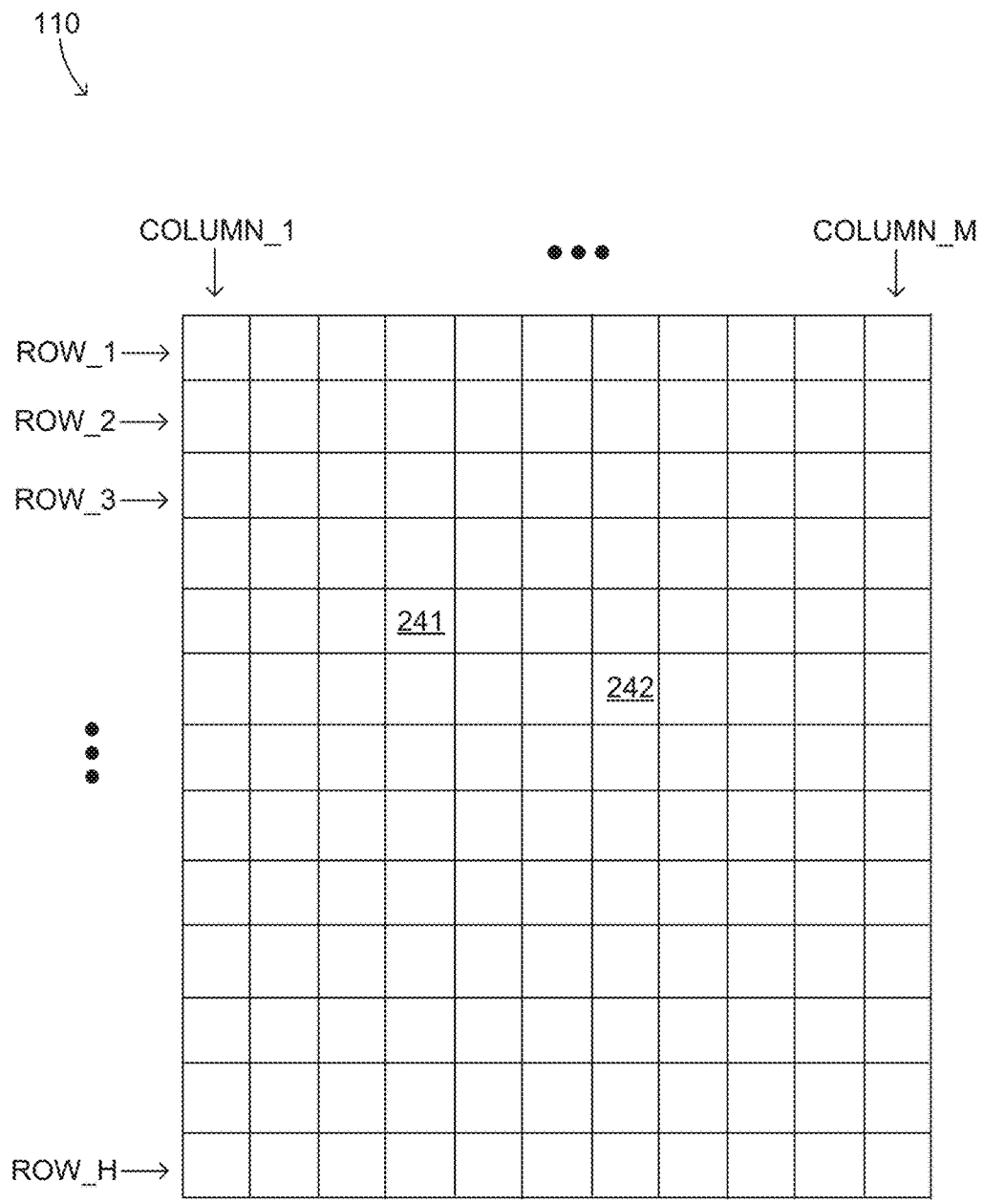
FIG. 2 is a diagram of a front view of the pixel array of the device of FIG. 1.

As mentioned above, pixel array 110 can capture light received via opening 104. Referring now to FIG. 2, a sample pixel array 110 has a two-dimensional array of pixels, which are also sometimes known as sensors. The pixels can be arranged in rows and columns as shown, although other arrangements are also possible. The rows and the columns may be labeled according to their position as is shown, starting from one edge of the pixel array and ending in the opposite edge. Since device 100 is at least a depth imaging device, at least some or all of the pixels in pixel array 110 are depth-sensing pixels, which are also more simply known as depth pixels. A sample first depth pixel 241 and a sample second depth pixel 242 are shown, although others of these pixels can be considered to be such a first and a second depth pixel. Similarly, first depth pixel 241 is in a row that can be characterized as being a first row, second depth pixel 242 can be characterized as being a second row, and thus any row can be characterized as first or second, unless specified otherwise—for example if it is specified that the rows have ordinal numbers according to their position.

In the case of a T-O-F depth imaging device, when the depth pixels are exposed to an input image, i.e. receive light reflected from an object, coming from field of view 112 and redirected by lens 106, they generate signals responsive to the light they receive. Typically these signals are in the form of electric charges. By their magnitude, these signals encode individual sensed values for the light, which is why they are also called samples. More particularly, these individual sensed values for the light can be individual pixel exposure values that depend on pixel position, pixel integration time and light intensity modulation within that time, and can be called integrated or time-averaged light intensity samples.

This is also why the entire pixel array 110 is sometimes called a sensor or a light intensity sensor. In the case of a ranging device, it is distance information that is ultimately computed from captured pixel signals, which justifies referring to the pixels as depth-sensing pixels, and to the pixel array 110 as a depth, distance or range sensor.

Returning to FIG. 1, device 100 may additionally include a processor 120. As will be seen, processor 120 may perform image processing functions upon receiving the signals or samples from pixel array 110, ultimately for rendering the depth image. These functions may include the computation of phase corrections, depth values and adjusted depth values, etc.

Device 100 may further include a controller 130. As will be seen, controller 130 can be configured to control the operation of pixel array 110 and other components of device 100, such as light source 114. Controlling may be performed example by transmitting signals that control their operations. In some embodiments, controller 130 receives inputs from processor 120, for example to adjust imaging parameters of the samples, of the exposure, etc. For instance, in some embodiments it can adjust the brightness or average output power 114 to avoid pixel overexposure in pixel array 110, etc.

Processor 120 and/or controller 130 can be implemented with one or more Central Processing Units (CPUs), digital signal processors, microprocessors, microcontrollers, application-specific integrated circuits (ASICs), programmable logic devices (PLDs), and so on. Controller 130 may optionally be formed integrally with pixel array 110, processor 120, and possibly also with other components of device 100, perhaps in a single integrated circuit. Controller 130 may control and operate pixel array 110, by transmitting control signals from output ports, and so on, as will be understood by those skilled in the art.

Device 100 may further include a memory 140. The samples can be stored in memory 140, preferably as digital values representing the signals generated by the pixels. The samples may be further processed before and/or after being stored in memory 140. In embodiments, memory 140 is configured to store final samples computed by processor 120 as the rendered image. Memory 140 may be implemented together with processor 120 and/or controller 130.

In embodiments, a T-O-F depth imaging device has the capability to perform the depth data correction described elsewhere in this document, including the capability to internally store the look-up table needed to perform it. The capability may be provided by a dedicated circuitry in the device or by its multi-purpose digital data processing subsystems, such as a microprocessor and RAM memory.

Digital values representing the electric charges generated by the pixels—and, ultimately, integrated light intensity samples—can be stored in memory 140. The digital values may be subjected to some form of digital processing in processor 120 before and/or after being stored in memory 140. In some embodiments, memory 140 may be configured to store depth values computed by processor 120 from the light intensity samples also stored in memory 140. The stored depth values may be organized into raster or vector depth images. Processor 120 may further process the stored depth images and store the results in memory 140. This use of memory 140 is optional. The memory 140 is typically necessary to store raw light intensity samples as they are read out from pixel array 110, until they can be used to compute depth values. Depth data or data produced by further processing of depth data in processor 120 often do not need to be stored or buffered in a ranging system, but can be output as soon as they become available, in a more or less continuous data stream. Memory 140 may be implemented together with processor 120 and/or controller 130.

As will be seen, processor 120 may perform image correction functions upon receiving raw frames from pixel array 110 or when computing depth images. These functions may include pixel-by-pixel weighted averaging of pairs of raw frames, using a predetermined set of weights stored in memory 140, adding offsets stored in a look-up table in memory 140 to appropriate depth values to depth images, correcting distortion of the raw and depth images caused by lens 106, and the like.

Device 100 may moreover include a user interface 150, which can be configured to receive inputs from the user. The inputs can be for controlling the operation of device 100, such as for adjusting operation parameters of pixel array 110 and light source 114 and/or image processing parameters used by processor 120. In some embodiments, interface 150 is implemented by one or more standalone components, such as actuators, buttons, circular wheels and the like on casing 102. User interface 150 can also be configured to generate human-perceptible indications so as to communicate to the user.

Optionally, device 100 also includes a display 160, which can be considered to be part of user interface 150. Display 160 can include a screen.

When provided, display 160 can display images, such as raw images output by pixel array 110, and processed depth images that are also known as rendered depth images. The images may also include any intermediate results of data processing between the raw images and the rendered depth images that can be presented in a visual form. A user can view the displayed images, and use them to better align casing 102, so that object 101 will be placed within field of view 112. Moreover, a user may adjust device operation parameters and/or image processing parameters while receiving feedback from the images displayed on display 160. The screen of display 160 can be a touchscreen, through which inputs can be received from the user. The displaying of images of any kind on display 160 may be done in parallel with outputting the same or other data to other appropriate devices.

Figure 3:
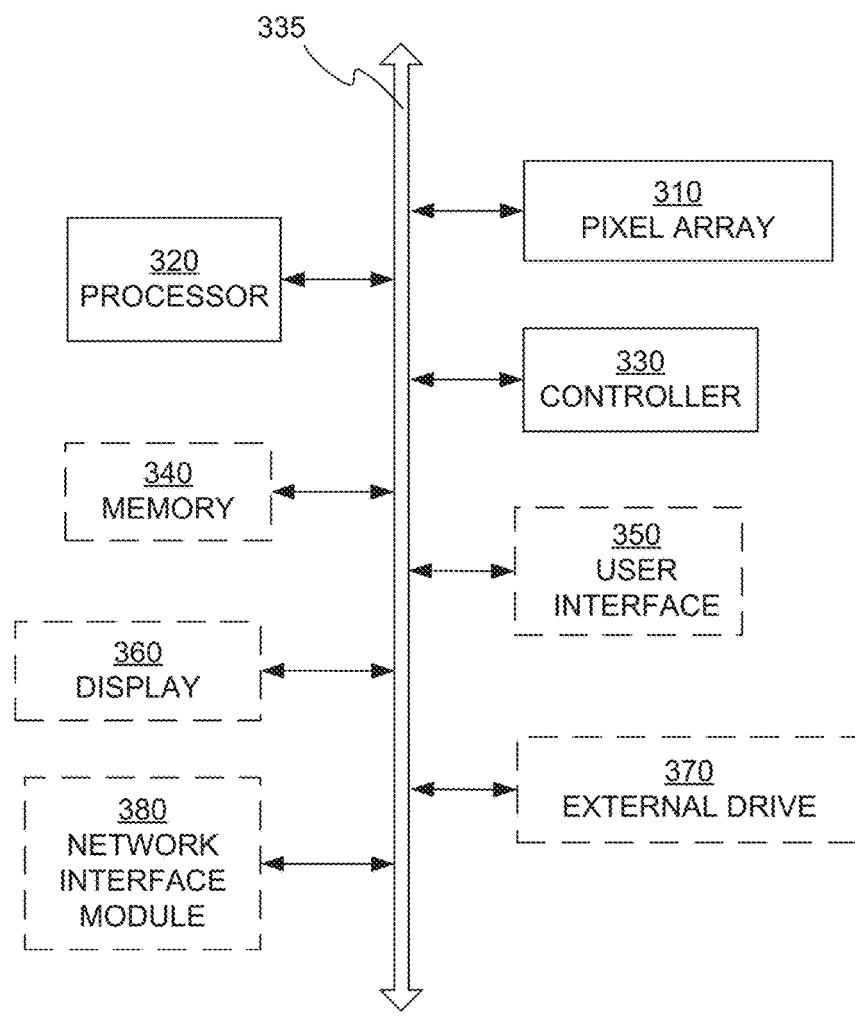
FIG. 3 depicts a sample controller-based system made according to embodiments.

FIG. 3 depicts a controller-based system 300 for a device made according to embodiments. As will be appreciated, system 300 can include components of device 100 of FIG. 1.

System 300 includes a pixel array 310 that is made according to embodiments, and which could be similar to pixel array 110 of FIG. 1. As such, system 300 could be, without limitation, a computer system, a depth imaging system, a regular imaging system, a scanner system, a machine vision system, a vehicle navigation system, a smart telephone, a video telephone, a personal digital assistant (PDA), a mobile computer, a surveillance system, an auto focus system, a star tracker system, a motion detection system, an image stabilization system, a data compression system for high-definition television or a moving picture ("movie"), and so on.

System 300 may additionally include a processor 320 and a controller 330, which may be similar to processor 120 and to controller 130 respectively. In some embodiments, these components communicate among themselves over a bus 335, as shown in FIG. 3.

System 300 may also include a memory 340, which could the previously mentioned memory 140. Memory 340 can be a Random Access Memory (RAM), a Read Only Memory (ROM), a combination, and so on. Memory 340 may be configured to store instructions that can be read and executed by processor 320 and/or controller 330. Memory 340 may be configured to store the samples captured by pixel array 310, both for the short term and the long term.

System 300 further optionally includes a user interface 350, which can be made as the previously described user interface 150. Moreover, since system 300 does not necessarily have to be implemented with a casing, there can be more and different configurations for user interface 350, such as by using a keypad, a keyboard and so on. Memory 340 may be configured to further store user data that is accessible to a user via user interface 350.

System 300 further optionally includes a display 360, which can be considered to be part of user interface 350. Display 360 could be display 160 of FIG. 1, or a computer screen display, a custom display, a plasma screen, and so on. Display 360 can show to a user a depth image captured by pixel array 310, and so on.

Furthermore, system 300 may include an external drive 370, which can be a compact disk (CD) drive, a thumb drive, and so on. System 300 can also include a network interface module 380. System 300 may use module 380 to transmit data to or receive data from a communication network. The transmission can be via wires, for example via cables, or USB interface. Alternately, the communication network can be wireless, and module 380 can be wireless and include, for example, an antenna, a wireless transceiver and so on. The communication interface protocol can be that of a communication system such as CDMA, GSM, NADC, E-TDMA, WCDMA, CDMA2000, Wi-Fi, Muni Wi-Fi, Bluetooth, DECT, Wireless USB, Flash-OFDM, IEEE 802.20, GPRS, iBurst, WiBro, WiMAX, WiMAX-Advanced, UMTS-TDD, HSPA, EVDO, LTE-Advanced, MMDS, and so on.

Depth imaging operations according to embodiments are now explored in more detail.

Figure 4:
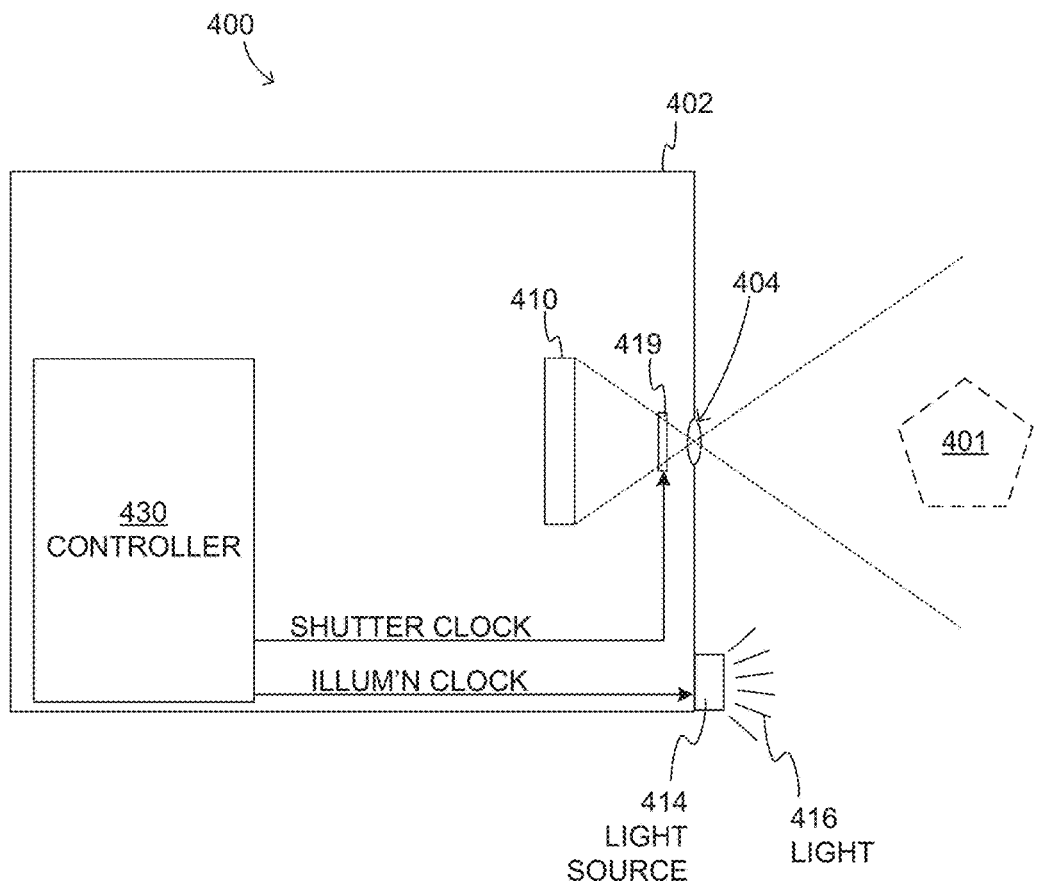
FIG. 4 is a diagram of some components of the device of FIG. 1 that are salient for depth imaging according to embodiments.

FIG. 4 repeats aspects of the device of FIG. 1 that are salient for depth imaging according to embodiments, and further adds aspects. A T-O-F depth imaging device 400 can be configured to render a depth image of an object 401. Device 400 includes a housing 402 with an opening 404, a pixel array 410, a controller 430, and a light source 414 on housing 402. As mentioned before, a lens or other light focusing component may be installed in the opening 404.

Controller 430 can be configured to generate an illumination clock signal and a shutter clock signal, which can be periodic. Both of these signals can be modulated at an operating frequency that is chosen as desired. An often used clock frequency is 20 MHz, which, if equaled by the dependent frequencies of illumination intensity modulation and shutter opening, enables a TOF ranging system to unambiguously measure distances to objects up to 7.5 m away.

While these two signals are at the same operating frequency, they may have a phase difference between them which, for purposes of this document, can be called a driver phase difference. As will be seen, the driver phase difference may be zero, change to other values, repeatedly step through an ordered series of values, and so on. Values of the driver phase difference may be given in units of angle, time and the like, just as phase values, as will be understood by those skilled in the art. The driver phase difference may be changed by changing the phase of one clock signal while keeping the other unchanged, or by changing the phases of both clock signals, whichever is most convenient.

The synchronous modulation of the 2 clock signals is reflected by synchronous modulation of the intensity of light 416 and the transmission of shutter 419. A shutter opening and closing to incident light at the frequency of the light intensity modulation can act as a global optical demodulator for pixel array 410. Combined with such a demodulator, the pixel array has the ability to sample the intensity of incoming light at different phases of its modulation. The sampling is done independently by each active pixel in array 410. From light intensity samples acquired sequentially or in parallel at 3, 4 or more different phases, modulation phase difference between emitted light 416 and reflected light falling on a pixel may be calculated. This phase difference or shift may then be converted to distance between the device 400 and some point on the surface of object 401. The relation between the phase difference and distance is unambiguous only for distances up to a certain limit often called ambiguity distance. Every distance beyond this limit shares phase shift with one distance below the limit, which makes the two indistinguishable without some additional information other than the phase shift value.

Light source 414 may emit light 416 towards object 401. Light 416 can have light intensity, brightness or power responsive to the illumination clock signal. The exact dependence of instantaneous and time-averaged light source output power on the behavior of the illumination clock signal may be different in different embodiments, ranging from a simple linear relation between the clock signal value and instantaneous power to much more complicated relations. Notwithstanding the possible complexity of the relation, periodic modulation in time of some property of the illumination clock signal (e.g. value, frequency, phase or duty cycle) must result in a similarly timed modulation of power or intensity of light 416.

As the illumination clock signal is modulated, light 416 is modulated accordingly, that is to say, periodically with a frequency equal to that of the illumination clock signal. In some embodiments, light 416 is modulated by turning on and off, typically in phase with the illumination clock signal, by varying its intensity smoothly in a pattern resembling a sinusoid, and so on.

Device 400 also includes an optical shutter 419 placed in front of pixel array 410. Optical shutter 419 can be configured to alternately open and close, responsive to the shutter clock signal. Opening and closing may be absolute or gradual. Accordingly, optical shutter 419 can be configured to alternately open and close in the sense of transmitting a higher or lower percentage of incoming light, in response to the shutter clock signal. The percentage of light passing through the shutter may vary smoothly or abruptly between the minimum and maximum values, which may both be anywhere between 0 and 100%, and the changes typically remain synchronized with the shutter clock signal. Optical shutter 419 can be, for example, a fast electro-optical shutter, in which a periodically changing voltage signal applied to a semi-transparent material changes its transparency to light of certain wavelengths.

A portion of light 416 may be reflected from object 401 toward opening 404, and through this opening reach optical shutter 419. The shutter may allow some portion of the incident light to pass through and reach pixel array 410. The transmission of the shutter is controlled by a shutter clock signal, and can vary between minimum and maximum values, at which the shutter can be considered, respectively, closed and open, even if the minimum value is not 0, and the maximum value is not 1. The exact relation between the shutter transmission and the shutter clock signal may vary in embodiments, and does not have to be a simple linear relation. What is required is that periodic modulation of some property of the shutter clock signal must produce a synchronized periodic modulation of the shutter transmission. As a result, optical shutter 419 may further modulate the modulated light coming from the object, before it reaches the pixel array. The operating frequency of the shutter can be set to equal the light intensity modulation frequency, so that the shutter acts as a global demodulator for the pixel array. The periodically varying transmission of the shutter can be the demodulation function that makes the light intensity integrals produced by the pixel array approximate sums of many samples of light intensity, each captured at a specific light modulation phase that, in general, is not the same for all the samples.

It will be recognized, then, that the depth pixels in array 410 are configured to sense a portion of emitted, intensity-modulated light 416 that is reflected from object 401 back towards housing 402, and further passes through opening 404 and optical shutter 419 while optical shutter 419 is open. It is this combination of aspects that enables the Time-Of-Flight (T-O-F) depth imaging. The shutter clock signal can be considered as an instance of a demodulation signal, since it effectively changes the sensitivity of the pixels in the array 410 to light 416. The effect of the shutter on the sensitivity of the pixels is usually global, i.e. all the pixels are affected in the same way at any given timeshutter on the sensitivity of the pixels is global, i.e. all the pixels are affected in the same way. may be c. The sensitivity of the pixels may also be dependent on their internal states, namely, on whether any particular pixel is, at a given time, integrating light, being read out, being reset, etc. Depending on the design of pixel array 410, its pixels may cycle through a finite series of internal states in unison or not. In the latter case, different timing schemes may introduce different time offsets between the cycling of different pixels. A very popular timing scheme is known as Electronic Rolling Shutter (ERS). Its basic postulate is that, at any time during operation of a pixel array, one row of pixels in an array should be read out and then reset, while all other rows should integrate light. The reading of rows should continuously proceed from the top to the bottom of the pixel array, and then again from the top. The light integration in pixels should cease only when a particular row of pixels is being read out.

In some embodiments, for T-O-F depth imaging it is chosen to use sequentially four phases at 0°, 90°, 180° and 270°, over which the depth pixels would integrate. The phase difference between the illumination and shutter clock signals can be cycled through a series of 4 values, for instance, 0°, 90°, 180° and 270°. Additionally, these values can all be shifted by the same arbitrary angle: for example, a shift of 40° will produce the values of 40°, 130°, 220° and 310°. Any such shift can be disregarded, and the sequence of shifted values considered equivalent to the 0°, 90°, 180°, 270° sequence, as will be understood by those skilled in the art.

The sequence of these four phases could be in a different order, in other words the same four values can also be ordered differently, producing a different sequence for the phase difference to cycle through. It will also be understood that depth imaging can be performed by stepping the phase difference through any number of values not smaller than 3, i.e. 3, 4, 5, 6 and so on The phase difference between the shutter clock signal and illumination clock signal influences how much light is integrated by pixels of the array and converted to light intensity samples. There are many other factors influencing each pixel's signal, but, as long as those factors do not make the signal too small or too non-linear, a set of 3, 4, or more signal values captured from one pixel at different, evenly spaced values of the phase difference is sufficient to compute a depth value for that pixel.

To produce a depth image or frame (i.e. a map of measured distances to objects), one should ideally obtain depth values nearly simultaneously from all the pixels in array 410. If light intensity samples produced by some pixel are not good enough to yield a valid depth, an invalid depth value may still be included in a depth image. Alternatively, validity of depth values from different pixels may be evaluated, using methods known to those skilled in the art, and the depth values judged invalid may be replaced by substitute values, according to a preferred substitution scheme.

A TOF camera typically captures 4 raw frames while stepping the variables-phase clock through the phase differences of 0°, 90°, 180°, and 270°. A phase difference between the shutter clock signal and the illumination clock signal may influence how much light is sensed by different pixels of the array, and converted to samples. This variation may be accomplished by varying the phase of just one of the clocks that control the signals, and preferably the clock that can be varied with the least inconvenience.

In embodiments, depth images of an object are ordered sets of numeric values equal or proportional to distances between the device and different points on the surface of the object, measured using the T-O-F technique. The pixels may perform sequential capture of light intensity integrals necessary for T-O-F ranging, using the ERS integration timing scheme with a fixed, global integration time. The readout of the intensity integrals from the pixel array, their digitization, and subsequent digital processing and/or outputting are performed in accordance with the same timing scheme by dedicated circuits included in the device.

A top-level specification for the ERS timing scheme may be either a raw frame rate or depth frame rate, meaning, respectively, the rate at which frames or images consisting of unprocessed light intensity samples are generated by the device or the corresponding rate for frames or images consisting of depth values. The integration time and the raw frame rate are, in the simplest case, inversely proportional to each other. The raw frame rate is typically an integer multiple of the depth frame rate. The light source may emit towards the object a wide-angle beam of light, whose intensity is modulated, as mentioned above.

As mentioned previously, the difference between the phase of the demodulation function and the phase of light intensity modulation at the light source can be stepped through several different values, e.g. 0°, 180°, 90° and 270° degrees, for example at a rate equal to the raw frame rate of the ERS timing scheme. This implies that each light intensity integral at most includes intensity samples taken at 2 different modulation phases.

The percentage contribution of samples taken at any particular modulation phase to a light intensity integral may vary from 0 to 100%. If it is 100%, then the integral can be viewed as a "pure one-phase intensity sample" averaged over the integration time. As mentioned before, the methods of calculating depth values from 3 or more such intensity samples are well known in the art. However, in the device under consideration, such samples or integrals could be produced by, at the most, 1 row of pixels in the pixel array during every integration cycle. The position or ordinal number of this row in the pixel array can be selected by adjusting the time offset between the starts or ends of the integration cycles in the ERS scheme and the timing of the modulation-demodulation phase shift changes.

Irrespectively of the existence and position of the single "one-phase row" in the array, the pixels in all other rows produce, in every integration cycle, intensity integrals that include contributions from two different modulation phases. The two phases are the same for all the pixels, but they contribute in different proportion in each row, as each row is characterized by a unique time offset between the start or end of integration in the row and the modulation-demodulation phase shift change.

At each row of pixels, this time offset and the proportion of two phase contributions in light intensity integrals do not change from one integration cycle to the next. All that changes are the two phases. For example, if the proportion of phase contributions is 25% and 75% for a particular row of pixels, and the modulation-demodulation phase shift is repeatedly stepped through the 0°, 90°, 180°, and 270° values, then, in the first integration cycle, the pixels in the row may sample light intensity at modulation phase 0° for the first ¼ of the integration time, and at phase 90° for the next ¾ of the integration time. The integral produced may be said to be 25% phase 0° and 75% phase 90°. Similarly, the second integration cycle yields an integral that is 25% phase 90° and 75% phase 180°, the third an integral that is 25% phase 180° and 75% phase 270°, the fourth an integral that is 25% phase 270° and 75% phase 0°, and so on. The four two-phase integrals given here as an example correspond to one-phase 0°, 90°, 180°, and 270° integrals produced in the same four integration cycles by the pixel in the aforementioned one-phase row.

While the standard depth computation method known in the art yields correct depth values when applied to the one-phase 0°, 90°, 180°, and 270° integrals, it produces incorrect depth values when applied to the corresponding two-phase integrals. Thus, a depth image computed in the standard way from 4 raw frames produced by the device contains mostly incorrect depth values. However, these values can be corrected in embodiments. The correction can be better in embodiments where the series of values through which the modulation-demodulation phase shift is stepped through can be written as $\varphi(i)=\varphi_0 \pm \text{mod}(i,n)*360°/n$, where n=3, 4, 5, . . . is the number of values in the series, i=0, 1, . . . , n−1 is the ordinal number assigned to each value in the series, mod(i,n) means i modulo n, and ± means that either + or − must be chosen to define the entire series. Put another way, a condition for the depth correction to be simple is that all the changes of the modulation-demodulation phase shift must be the same, either additions or subtractions of 360°/n in the circular plane angle space. When this condition is met, the correction of all the incorrect depths obtained from two-phase intensity integrals can be accomplished by adding to each of them a fixed offset, monotonically varying from one row of pixels in a depth frame to the next, but constant within each row. The offset values needed to do the correction, whose number equals the height of depth frames in pixels, can be easily stored in a small look-up table.

FIG. 5 shows known sample equations (5-1), (5-2), (5-3), (5-4) for depth calculations, when four phases are used. It should be recognized that sometimes these equations may differ if some assumptions do not apply, for example about the modulations being substantially sinusoidal, and so on. Equation (5-1) gives A(row, col), which is the sensed amplitude of the demodulated signals at the various phases. Equation (5-2) gives B(row, col), which is a measure of the background illumination.

Traditionally, the distance, or range, or depth, of object 101 from device 100 is given from the result of Equation (5-3), for each pixel. The result of Equation (5-3) is a measured phase difference between the demodulation clock signal and the modulation of light 116 reflected from object 101 and then captured by the pixels. Equation (5-4) gives the amount of uncertainty ("error", or "depth noise") in this measurement, which is inherent to the components of the device. Such uncertainty is understandable, as these devices are pushed to their fundamental limits.

Two possible modes are now described for exposure, namely an electronic global shutter mode and an electronic rolling shutter mode. It should be remembered that the electronic global shutter mode can be different from the exposure pattern that may be imposed by optical shutter 119, which is a physical shutter. This, even though an optical shutter can itself be considered a global shutter, since it affects the light reaching all the pixels simultaneously.

Figure 6:
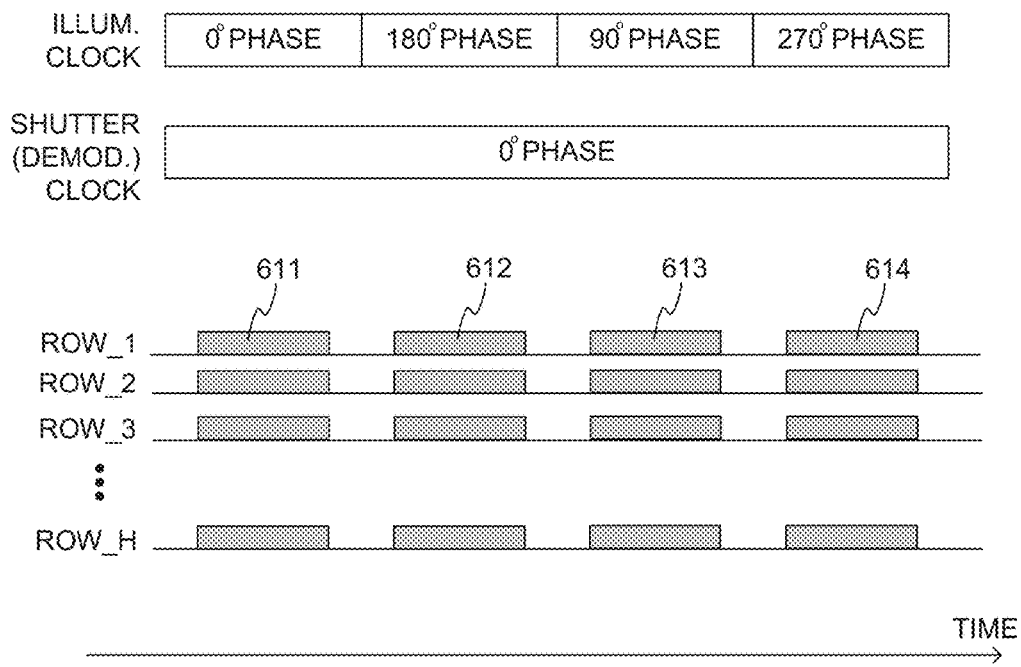
FIG. 6 is a sample timing diagram showing exposures for depth imaging by the device of FIG. 1, which uses an electronic global shutter mode.

FIG. 6 is a sample timing diagram for when an electronic global shutter mode is used. The illumination clock signal has phases as shown, which create corresponding driver phase differences. The pixels of each row are exposed, and sense light, concurrently with each other. The pixels of Row_1 are exposed for durations 611, 612, 613, 614. In addition, the pixels of the other rows are exposed concurrently with those of Row_1. In other words, all pixels start exposure at the same time instant, and likewise all end exposure at the same time instant. Moreover, in FIG. 6, all exposures have ended before the illumination clock signals shifts to the next phase.

Figure 7:
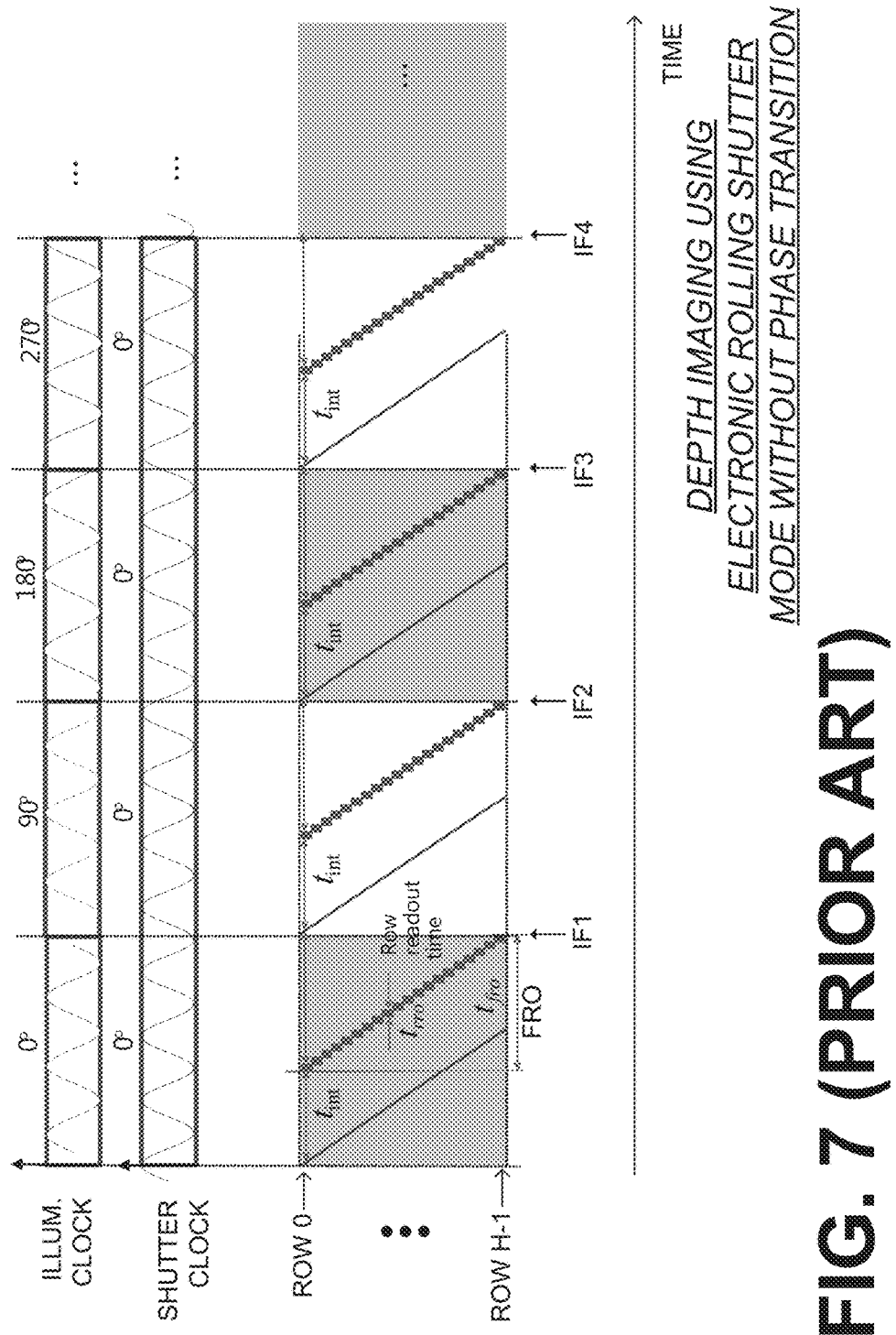
FIG. 7 is a sample timing diagram showing detailed depth imaging using an electronic rolling shutter mode without phase transition for the device of FIG. 1.

FIG. 7 shows detailed depth imaging using an Electronic Rolling Shutter (ERS) mode. The top two waveforms show the timing diagrams of the light modulator (illumination clock signal) and demodulator (shutter clock signal). Then a timing diagram is shown of signal integration and readout in an image sensor that uses an ERS mode. The pixels of each row are exposed, and sense light, concurrently with each other for an integration time $t_{int}$. After integration, each row is read out for a row readout time $t_{rro}$. While a row is neither sensing light by integrating, nor reading out, it is idle.

In FIG. 7, the rows are exposed sequentially, i.e. not concurrently. Each row's exposure starts some time after the start of the preceding row's exposure. Since exposure duration is the same for all rows, the end of each row's exposure is similarly delayed relative to the end for the preceding row. The delay between the exposure starts or exposure ends in adjacent rows is the same for all pairs of such rows in the sensor. The delay typically equals the time needed to read out 1 row $t_{rro}$, and is much shorter than the row integration time $t_{int}$.

In FIG. 7, a frame of all the rows is read out during a time duration FRO, which lasts for a time $t_{fro}$. The frame of raw images for the first phase is thus available at time IF1. Similarly, the frames of raw images for the other three phases are available at times IF2, IF3, IF4. After time IF4, one depth image can be generated. Moreover, in this example, for H rows here there is an exact relationship of $t_{fro}=H*t_{rro}$.

Image sensors in practically all mobile devices use ERS image sensors rather than global shutter sensors, because implementing an electronic global shutter mode requires larger pixels than those that can be used in ERS sensors. A limitation, however, is that there is idle time, and therefore a low frame rate. More particularly, in FIG. 7 exposures by all the pixels for a frame are completed before the illumination clock signal changes phase. The idle time is for rows that wait until the last row has completed, and before the phase can change.

Figure 8:
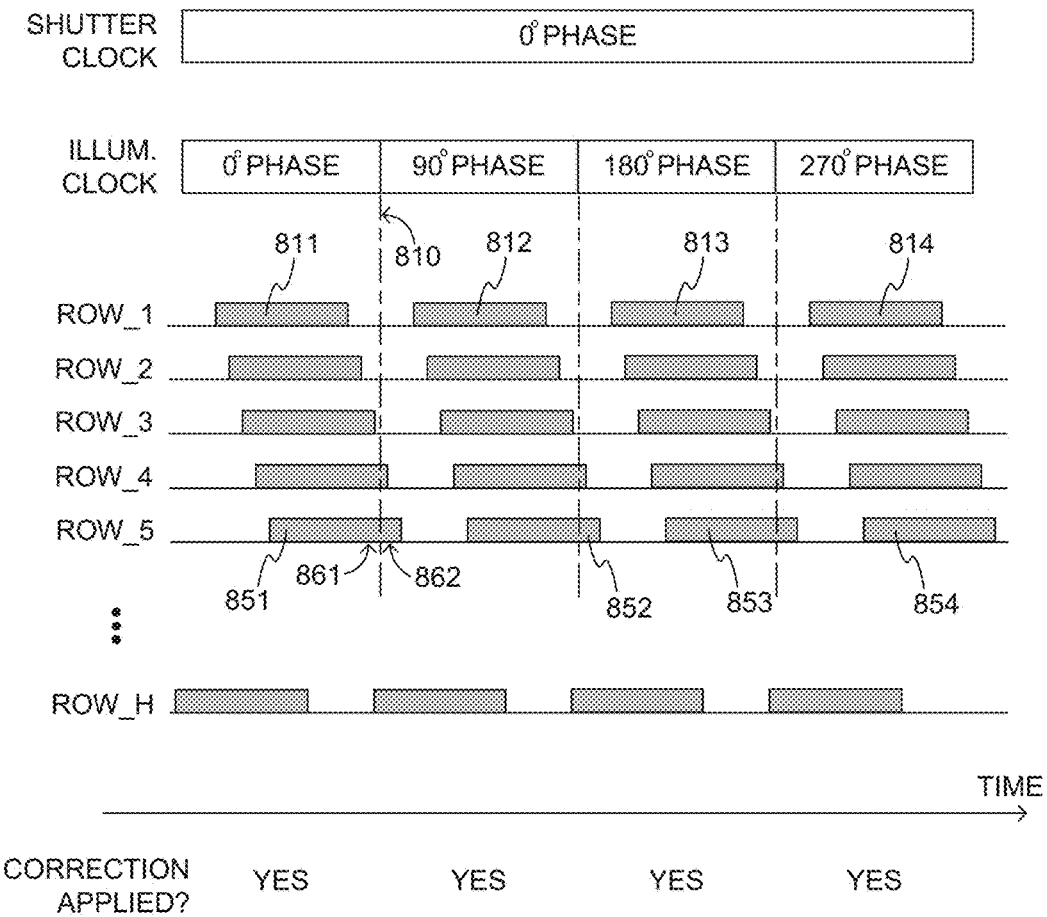
FIG. 8 is a sample timing diagram showing exposures for depth imaging by the device of FIG. 1, which uses an electronic rolling shutter (ERS) mode, phase transition, and corrections applied according to embodiments.

FIG. 8 describes embodiments. The shutter clock signal is of a constant phase, and the illumination clock signal changes phases, so that the driver phase difference rotates through different angle values. In fact, if the shutter clock signal is considered to be at 0°, then the driver phase difference has the angle values given by the illumination clock signal.

Pixels have exposures for depth imaging according to an electronic rolling shutter (ERS) mode. The pixels of ROW_1 have exposures 811, 812, 813, 814, for the respective frames, each of which takes place while the driver phase difference does not change. The pixels of ROW_5, however, have exposures 851, 852, 853, 854 for the respective frames, each of which takes place while the driver phase difference changes. For example, exposures 851 cross over boundary 810, and thus have a first portion 861 and a second portion 862 that are at different driver phase differences. The transition from before boundary 810 to after boundary 810 can be called a phase transition, and can be effectuated by the illumination clock signal changing phase, or the shutter clock signal changing phase, etc.

Accordingly, a first depth pixel in the array can be configured to thus sense a portion of the emitted light from a first time instant, when the driver phase difference has a first angle value, to a second time instant when the driver phase difference has a second angle value. The second angle value can be at least 25° different from the first angle value, for example 90°, as would happen when there is a phase transition. Preferably the sensing between the first time instant and the second time instant is continuous. Moreover, the first depth pixel can be further configured to generate a first depth value responsive to the sensing. Of course, other depth pixels may further generate their own depth values.

Since sensing occurs across a phase transition, error may be introduced in the depth values that are ultimately sensed. Further according to FIG. 8, a correction may be applied to the depth values according to embodiments, to compensate for the error introduced by the phase transition. More particularly, processor 120 can be configured to compute a first phase correction from an attribute of the first row that the depth first pixel is in, and then compute an adjusted first depth value from the first depth value and the first phase correction. Then a depth image of the object may be rendered, which includes the adjusted first depth value.

Corrections according to embodiments may be performed in a number of ways. In some embodiments, as mentioned above, a phase correction may be computed from an attribute of the row that the depth pixel is in. The attribute may include a location or position of the row, relative to locations of the other rows of the pixel array.

FIG. 9 shows equations for computing corrected depths according to embodiments. Equation (9-1) computes a row statistic for a row relative to the other rows. It should be observed that here the row position # is a number according to which exposure will happen, which is usually an ordinal number assigned when counting the rows starting from the edge of pixel array 110. An example is seen in FIG. 2, where rows have ordinal numbers from 1 to H. In the example of FIG. 9, the row statistic is a normalized row position w in a pixel array that has $N_{ROWS}$. This normalized row position w thus ranges from a very small number or possibly zero for the first row near one edge of the pixel array, to a number near 1 or possibly 1 for the last row near the other edge.

Figures 10A, 10B:
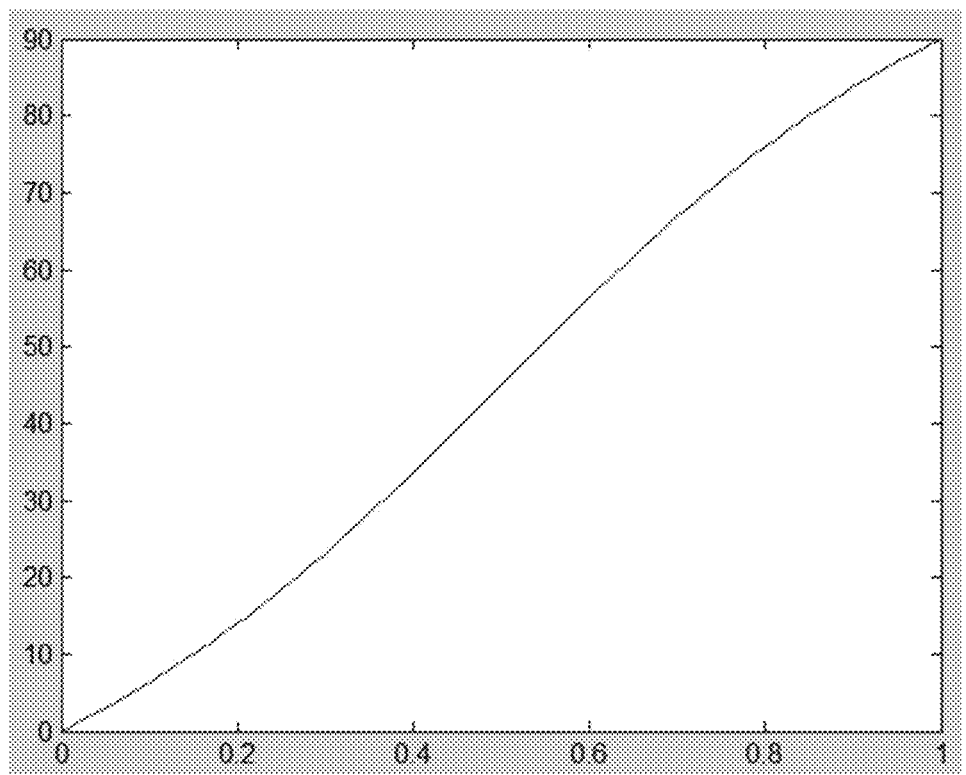
FIG. 10A shows a portion of Matlab code that can be used to plot a depth correction of the equations of FIG. 9.
FIG. 10B shows a plot that has been generated by the code of FIG. 10A.

Equation (9-2) computes a phase correction that uses the row statistic of Equation (9-1). Referring briefly to FIGS. 10A, 10B, code is shown for Equation (9-2), along with a plot for the phase correction that results from the code.

Returning to FIG. 9, In some embodiments, the adjusted first depth value is computed by subtracting the first phase correction from the first depth value. This is accomplished, for example, by Equation (9-3), which determines an adjusted phase by subtracting the phase correction of Equation (9-2) from what was determined by Equation (5-3).

Of course, what is written for a certain depth pixel in a certain row may apply also to additional depth pixels in that row. These additional depth pixels can be configured to sense the portion of the emitted light concurrently with the certain depth pixel, and to generate additional respective depth values responsive to the sensing. The processor can be further configured to compute additional adjusted depth values from the additional depth values and the phase correction computed for the certain depth pixel. The rendered depth image may include the additional adjusted depth values.

It will be understood that the phase correction is thus row-dependent. So, for a second pixel in a different row, a different row statistic will be computed, and a second phase correction will be computed from the different row statistic. The second phase correction may be different from the first phase correction of a first pixel in a different row.

As before, there is uncertainty ("depth error") in the measurements, when corrections are applied according to embodiments. This uncertainty may be characterized by Equation (9-4). It will be observed that Equation (9-4) includes an additional term in the denominator, compared to Equation (5-4). This additional term goes away at the edges of the pixel array, where w=0 or w=1, and therefore Equation (9-4) becomes identical to Equation (5-4) for those row positions. For other row positions, this additional term is larger than 1, and thus represents a degradation of the depth error—in other words an improvement resulting from embodiments.

Referring briefly to FIGS. 11A, 11B, code is shown for the additional term in the denominator of Equation (9-4), along with a plot for this additional term that results from the code. The improvement is maximized in the middle row of the array, by +3 dB.

FIG. 12 shows a flowchart 1200 for describing methods according to embodiments. The methods of flowchart 1200 may be implemented by embodiments.

According to an operation 1210, an illumination clock signal is generated. The illumination clock signal can be modulated at an operating frequency.

According to another operation 1220, light can be emitted by a light source towards an object. The light can be emitted responsive to the illumination clock signal, and therefore modulated according to the illumination clock signal.

According to another operation 1230, a shutter clock signal can be generated. The shutter clock signal can be modulated at the operating frequency. The shutter clock signal may have a driver phase differences from the illumination clock signal.

According to another operation 1240, an optical shutter can be alternately opened and closed. The opening and closing can be responsive to the shutter clock signal, and therefore open and close at the operating frequency.

According to another operation 1250, sensing may be performed by a first depth pixel. The sensing can be of a portion of the emitted light that is reflected from the object back towards the housing, and further passes through the optical shutter while the optical shutter is open. The first depth pixel may thus sense from a first time instant when the driver phase difference has a first angle value, to a second time instant when the driver phase difference has a second angle value.

According to another operation 1260, a first depth value may be generated by the first depth pixel, responsive to the sensing of operation 1250.

According to another operation 1270, a first phase correction may be computed from an attribute of the row that the first depth pixel is in.

According to another operation 1280, an adjusted first depth value can be computed from the first depth value and the first phase correction.

According to another operation 1290, a depth image of the object can be rendered that includes the adjusted first depth value.

Sample embodiments are now described where there is phase mixing, in that pixels are exposed to the reflected modulated light while there is a phase transition.

Figure 13:
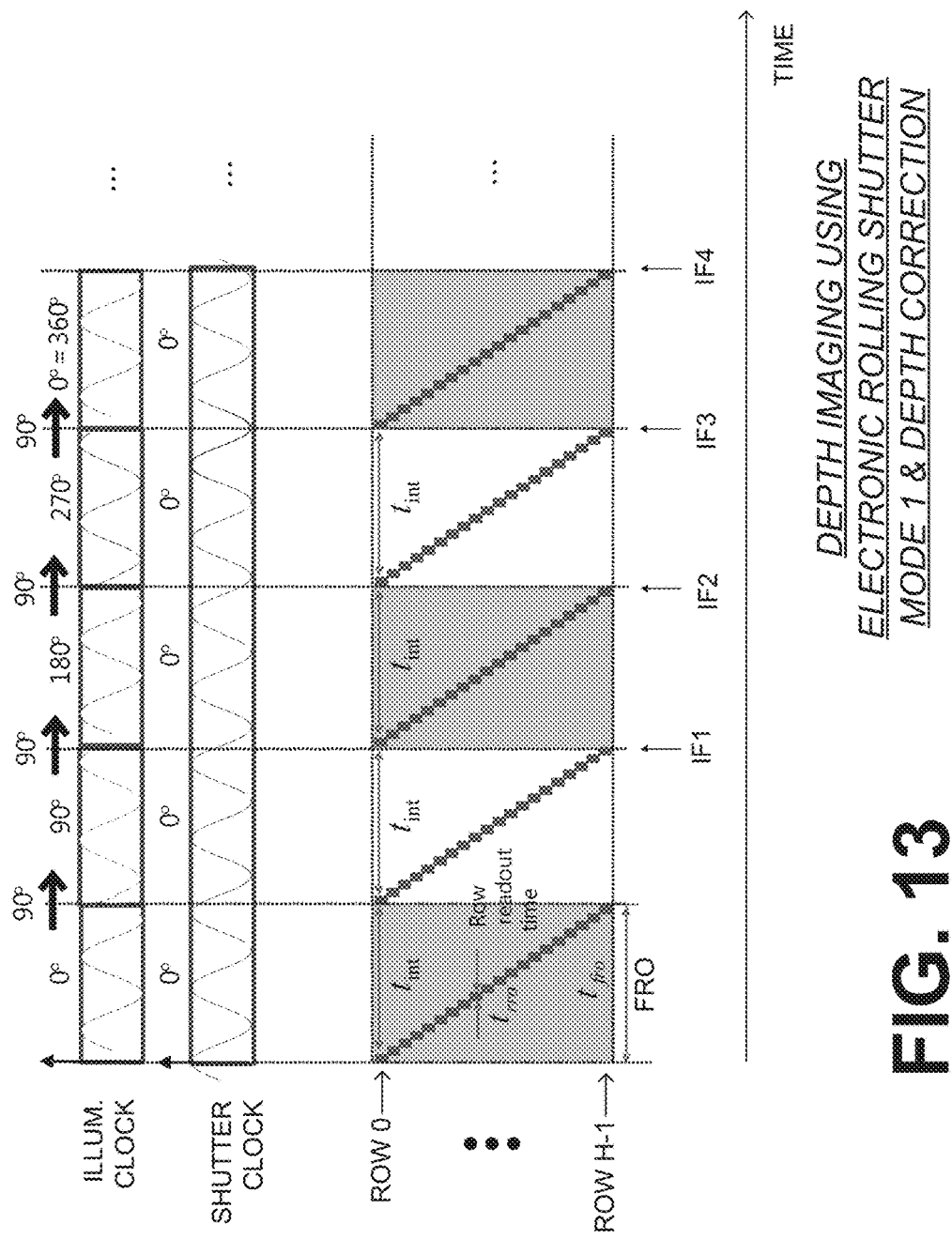
FIG. 13 is a sample timing diagram showing depth imaging using ERS and a first phase mixing mode with depth correction for the device of FIG. 1 according to embodiments.

FIG. 13 is a sample timing diagram showing depth imaging using ERS and a first phase mixing mode according to embodiments. It will be recognized that the illumination clock signal increases its phase by +90° every time.

The first mode of FIG. 13 uses an optimal relation between integration time and frame readout time, which is $t_{int}=t_{fro}-t_{rro}$. Accordingly, it achieves the maximum possible Signal-to-Noise Ratio (SNR) at a given frame rate.

Figure 14:
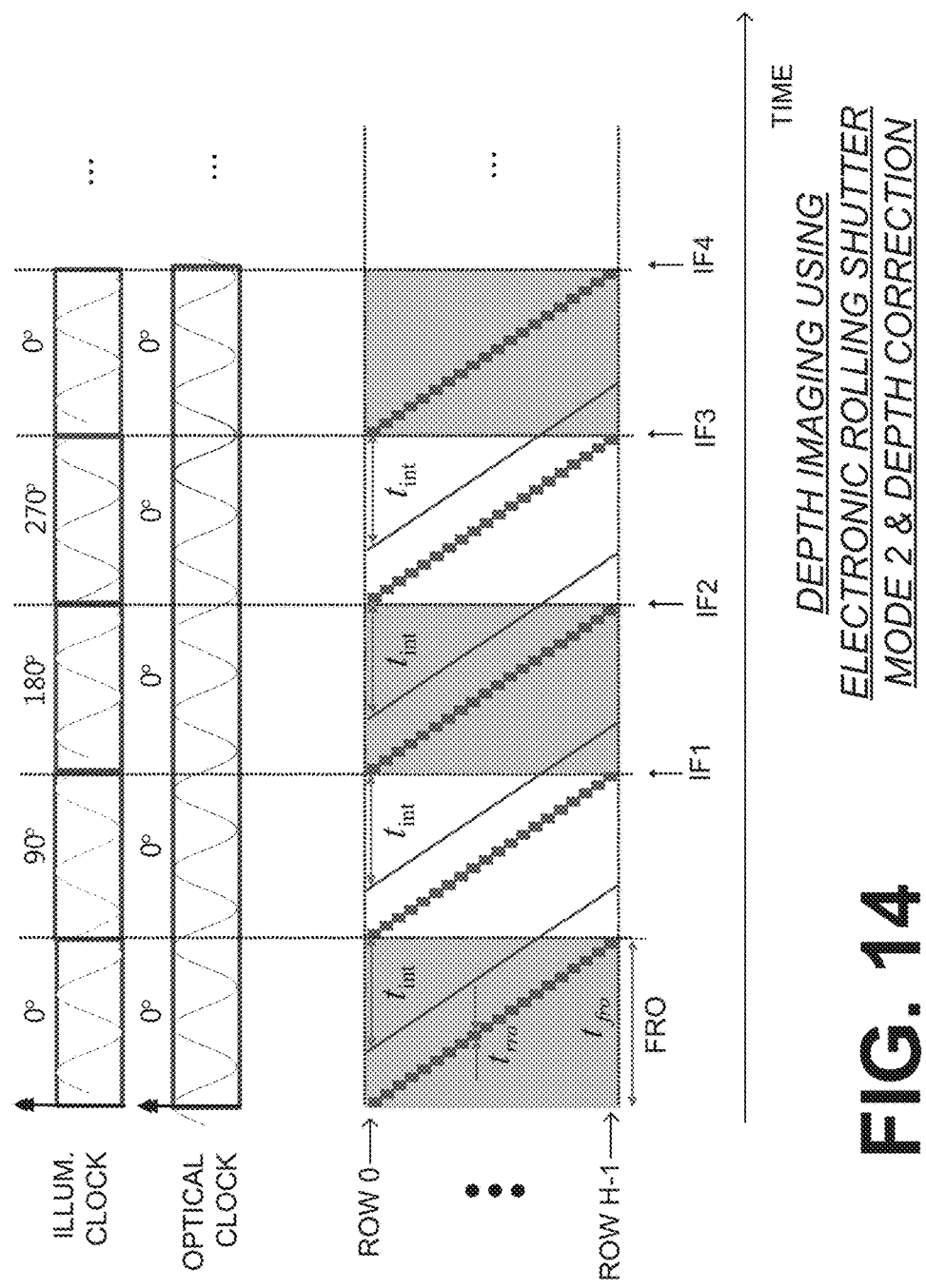
FIG. 14 is a sample timing diagram showing depth imaging using ERS and a second phase mixing mode with depth correction for the device of FIG. 1 according to embodiments.

FIG. 14 is a sample timing diagram showing depth imaging using ERS and a second phase mixing mode according to embodiments. The relation between integration time and frame readout time is not optimal—rather it is: $t_{int}<t_{fro}-t_{rro}$. Accordingly, the scheme of FIG. 14 achieves, at a given frame rate, a lower SNR than the scheme of FIG. 13, because light integration by the pixels lasts less long than in the scheme of FIG. 13.

Figure 15:
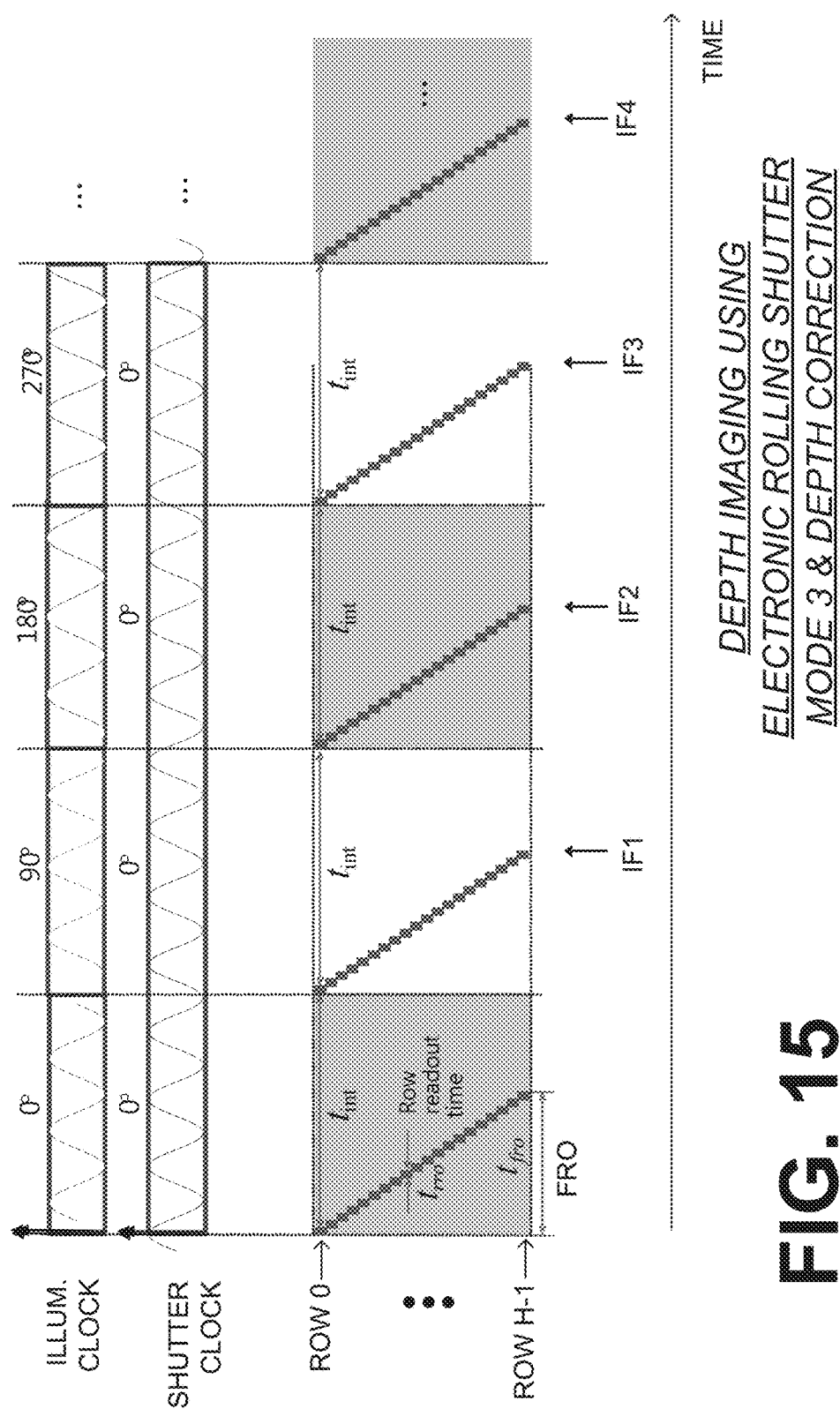
FIG. 15 is a sample timing diagram showing depth imaging using ERS and a third phase mixing mode with depth correction for the device of FIG. 1 according to embodiments.

FIG. 15 is a sample timing diagram showing depth imaging using ERS and a third phase mixing mode according to embodiments. The relation between integration time and frame readout time is not optimal—rather it is: $t_{int}>t_{fro}-t_{fro}$. Accordingly, the scheme of FIG. 15 improves the SNR over the scheme of FIG. 13, but achieves a lesser frame rate.

Modes 2 and 3 of FIGS. 14 and 15 can be seen as departures from Mode 1 of FIG. 13, which are made in the different directions of pursuing faster frame rate and longer integration time, respectively. Conversely, it may be noted that, if commonalities were to be sought between Modes 2 and 3 so as to optimize both the SNR and the frame rate, then Modes 2 and Modes 3 might converge asymptotically to Mode 1.

Figure 16:
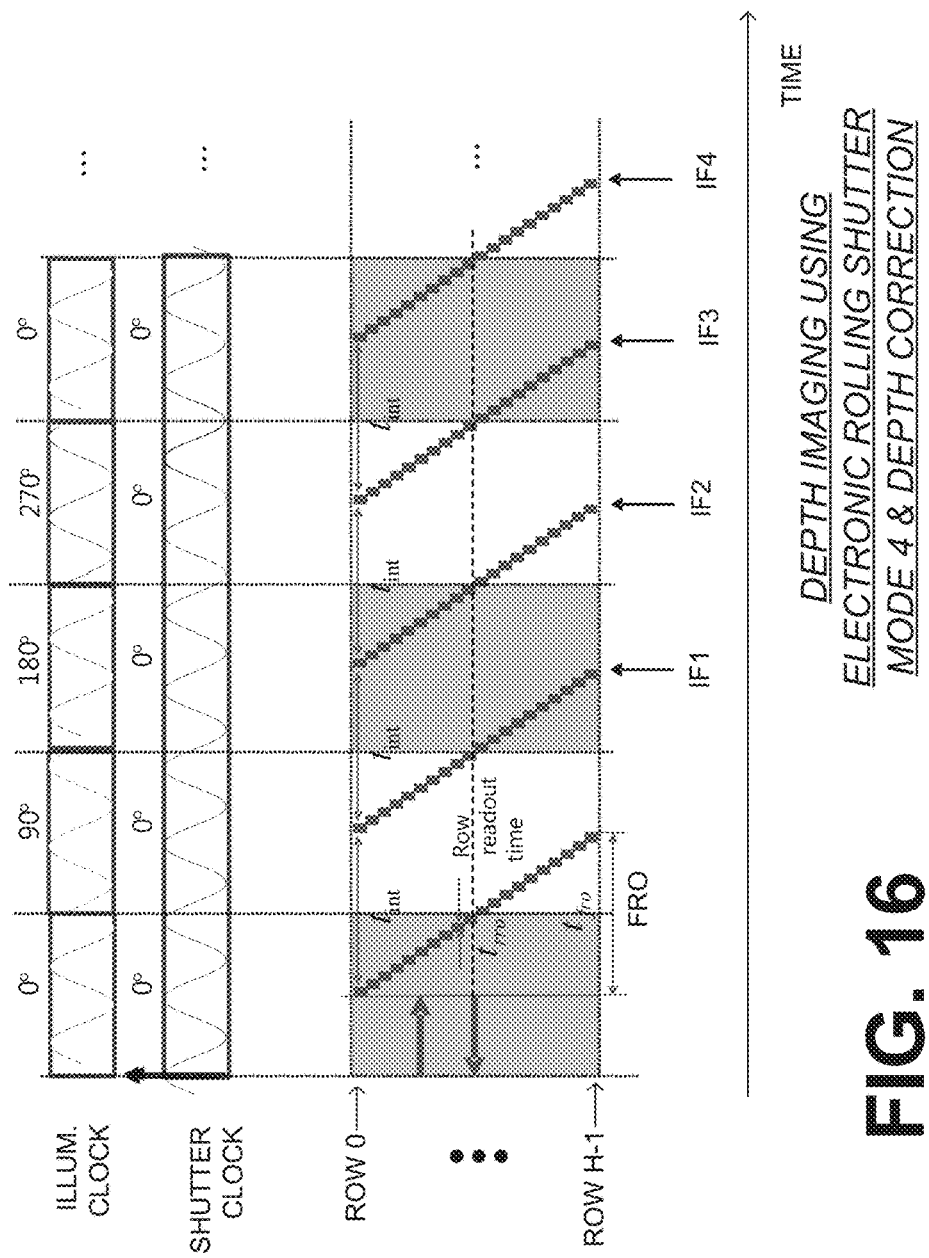
FIG. 16 is a sample timing diagram showing depth imaging using ERS and a fourth phase mixing mode with depth correction for the device of FIG. 1 according to embodiments.

FIG. 16 is a sample timing diagram showing depth imaging using ERS and a fourth phase mixing mode according to embodiments. The phase transitions are shifted compared to the scheme of Mode 1.

Figure 17:
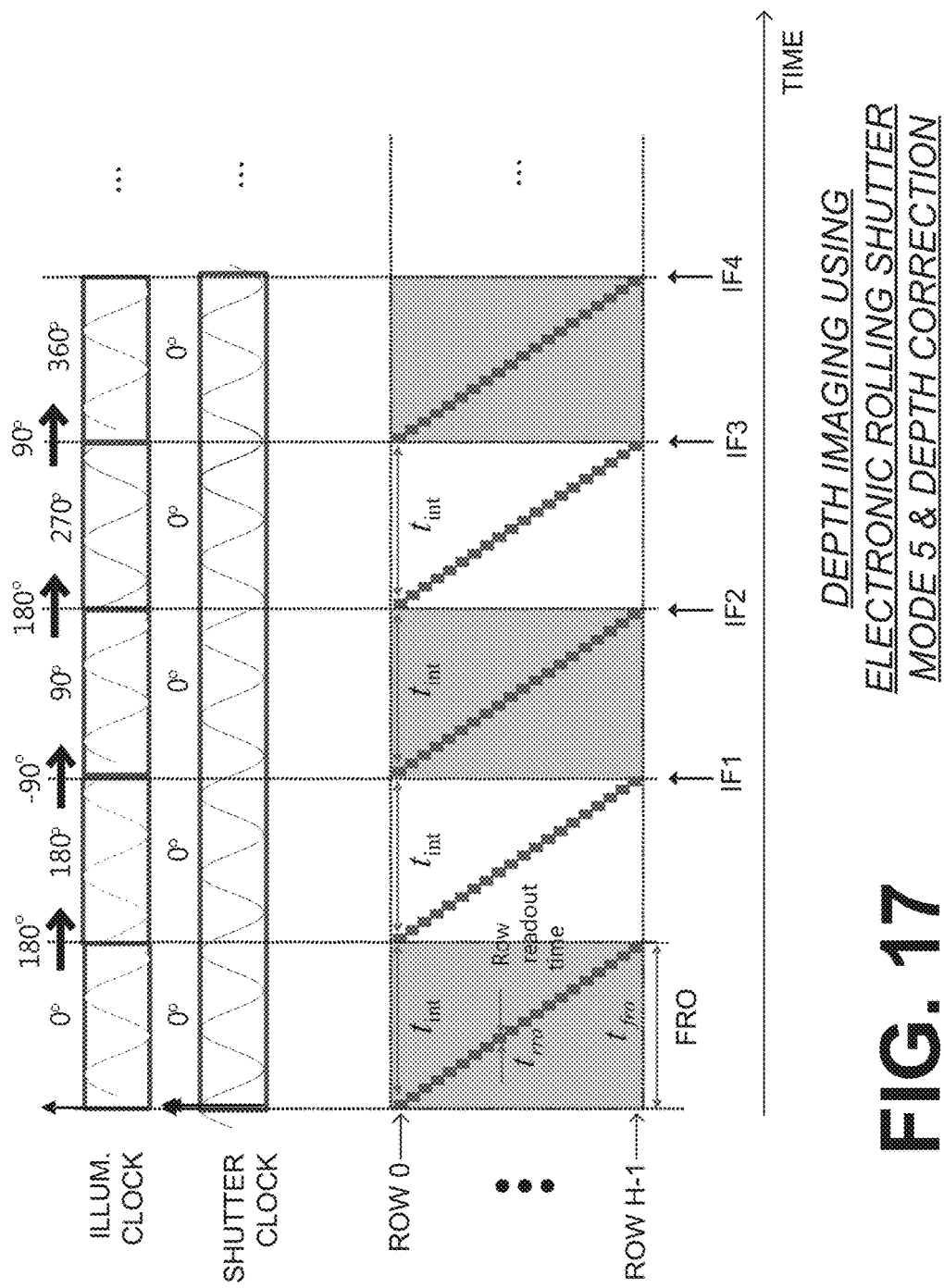
FIG. 17 is a sample timing diagram showing depth imaging using ERS and a fifth phase mixing mode with depth correction for the device of FIG. 1 according to embodiments.

FIG. 17 is a sample timing diagram showing depth imaging using ERS and a fifth phase mixing mode for the device of FIG. 1 according to embodiments. The phase increments of the illumination clock signal are unequal.

The inventors further identified the problem that sometimes there is blinking between successive rendered depth frames, when there is axial motion of the object with respect to the imaging device. The identified problem is now described in more detail.

Figure 18:
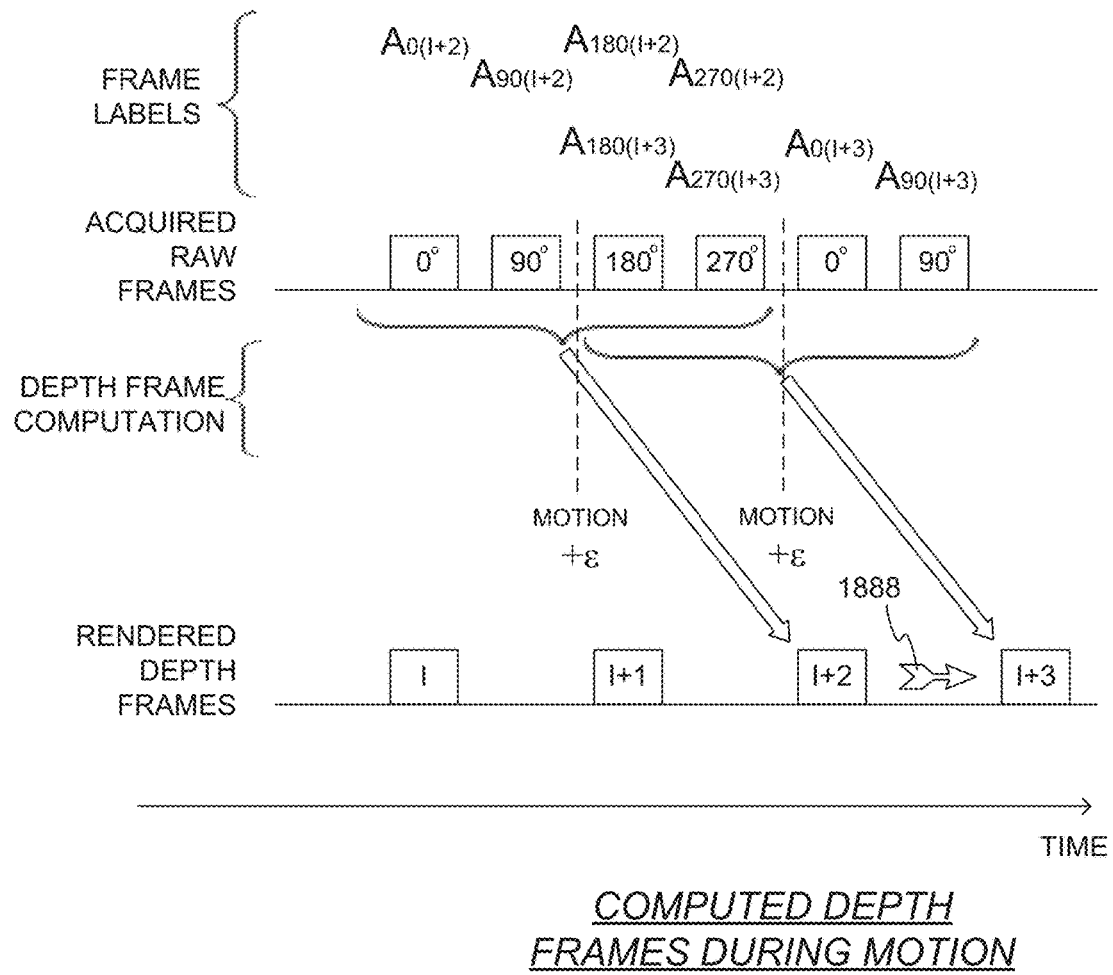
FIG. 18 is a timing diagram showing a sequence of rendered depth frames.

FIG. 18 is a timing diagram showing a sequence of depth frames rendered by computation from a sequence of acquired raw frames. Frame labels are shown above the acquired raw frames, which may apply to these raw frames. It will be understood that each raw frame might have more than one frame label. A frame label may be chosen for a raw frame based on which rendered depth frame it contributes at the time. In FIG. 18, each rendered depth frame is made by contributions of only the most recently acquired raw data frames.

In FIG. 18, a depth frame is rendered at the rate of once for every two acquired raw frames, which is called a 2-tap mode, and doubles the frame rate. A different frame rate is possible for the rendered depth frames.

The inventors identified that there is blinking at the particular frame rate of FIG. 18, for example at least at transition 1888 from frame i+2 to frame i+3. While the blinking problem seems to exist at transitions between successive frames, only one such transition 1888 is shown for simplicity.

More particularly, to compute depth correctly, all four input raw frames should be captured at the same time, in parallel, not sequentially. The inventors identified that, due to such non-coincident capture, any motion in the scene can introduce error into the calculated depth, and which can be exacerbated in the 2-tap mode. Specifically, objects moving axially (closer or further away from the camera) can cause "depth blinking", where calculated distance to the moving object alternates between shifting abruptly "closer" and "farther" between even and odd depth frames.

For example, one could assume that the object is moving closer to the ranging device, and the object thus becomes incrementally brighter due to coming closer to the light source of the ranging device. One could assume that the motion in each of the last two raw frames compared to the two previous raw frames is given by s. To further illustrate the insight developed about the problem, the inventors denote the positive axial motion increment as +ε at suitable locations in FIG. 18.

FIG. 19 shows equations developed by the inventors for further explaining the depth blinking of the transitions in FIG. 18. In FIG. 19, frame i+2 is shown in an upper space with Equations (19-1), (19-2), (19-3) and (19-4). Additionally, frame i+3 is shown in a lower space with Equations (19-5), (19-6), (19-7) and (19-8). Transition 1888 from frame i+2 to frame i+3 is also shown.

For frame i+2, Equations (19-1) and (19-2) show how the values of raw frames may be affected by the positive axial motion increment +ε. Equations (19-3) imports Equations (19-1) and (19-2) to generate Equation (19-4), which shows how the values for the computed depth may be affected by the positive axial motion increment +ε.

For frame i+3, Equations (19-5) and (19-6) show how the values of raw frames may be affected by the positive axial motion increment +ε. Equations (19-7) imports Equations (19-5) and (19-6) to generate Equation (19-8), which shows how the values for the computed depth may be affected by the positive axial motion increment +ε.

It will be observed that, while making transition 1888, there is a discontinuous switch from Equation (19-4), which adds motion increment +ε to its numerator and to its denominator, to Equation (19-8), which subtracts motion increment +ε from its numerator and from its denominator.

Some embodiments perform corrections to T-O-F depth image frames rendered for an object. These embodiments include devices such as were described above, with modifications that will be understood by a person skilled in the art. For example, an electronic global shutter scheme may be used or an electronic rolling shutter scheme may be used, with corresponding consideration about an optical shutter, and so on. In addition, a processor may perform additional or different functions, for example as is now described.

Figure 20:
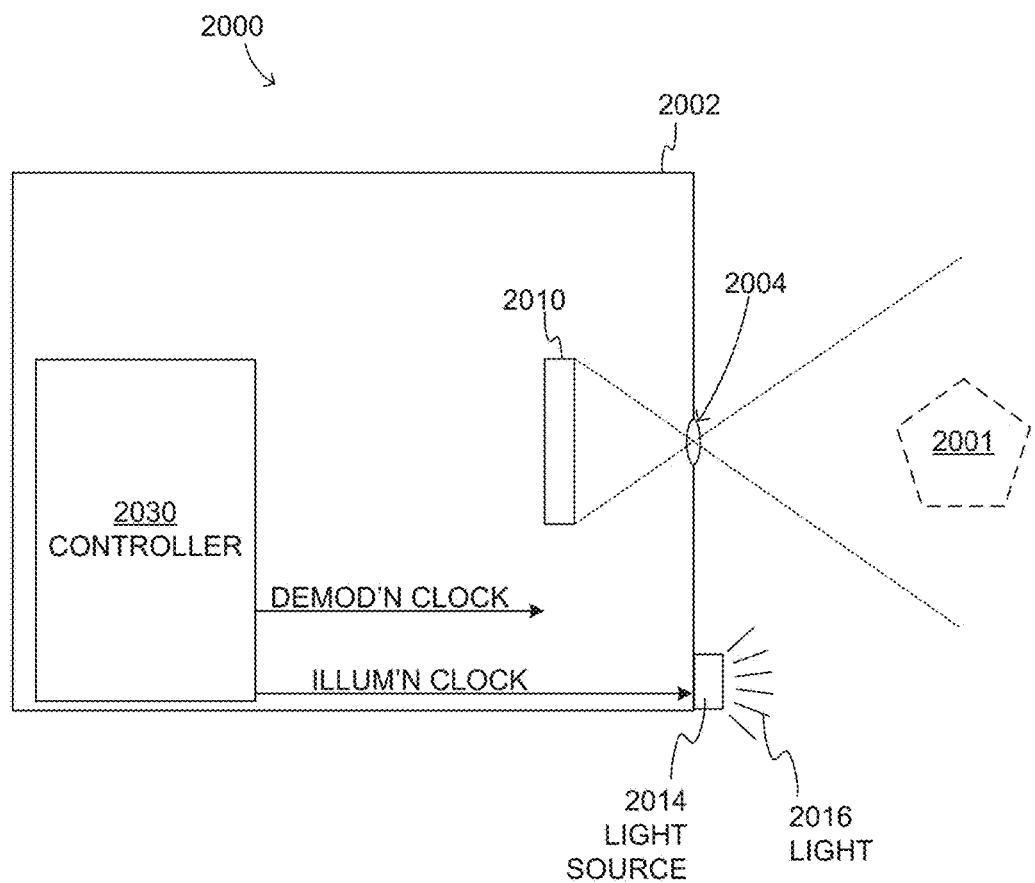
FIG. 20 is a diagram of some components of the device of FIG. 1 that are salient for depth imaging according to embodiments.

FIG. 20 is a diagram of some components of the device of FIG. 1 that are salient for depth imaging according to embodiments, and further adds aspects. A T-O-F depth imaging device 2000 can be configured to render a depth image of an object 2001. Device 2000 includes a housing 2002 with an opening 2004, a pixel array 2010, a controller 2030, and a light source 2014 on housing 2002.

Controller 2030 can be configured to generate an illumination clock signal at an operating frequency, as per the above. Light source 2014 can be configured to emit towards object 2001 light 2016 responsive to the illumination clock signal.

Controller 2030 can be further configured to generate a demodulation clock signal at the operating frequency. The demodulation clock signal can be configured to cause a sensitivity-modulation effect. The sensitivity-modulation effect may impact the depth pixels of pixel array 2010, for example as previously mentioned by modulating an optical shutter (not shown in FIG. 20), or by otherwise suitably affecting the sensitivity of the depth pixels. Given the variety of possible sensitivity-modulation effects, the demodulation clock signal is not shown as terminating anywhere specifically, in the partial diagram of FIG. 20. Accordingly, sensing by the depth pixels may be subject to the sensitivity-modulation effect.

The demodulation clock signal can have one of at least a first, a second, and a third driver phase difference from the illumination clock signal. In embodiments, it also has a fourth such driver phase difference, so as to create the conditions for acquiring the raw phases of 0°, 90°, 180° and 270° for the T-O-F depth sensing.

In embodiments, a T-O-F depth imaging device has the capability to perform a raw data correction, intended to reduce a type of quasi-oscillatory depth-frame-to-depth-frame variations of measured distances to moving objects that may be called motion-induced depth oscillation artifacts. Object movement toward or away from the device makes these artifacts appear in the device's depth output if the output is generated using a particular method aimed to increase the depth frame rate of the device.

Methods according to embodiments involve reusing captured raw frames in several successive computations of depth frames, in combination with varying series of other raw frames captured before or after the reused frame. Each raw frame captured by the device may be labeled with one or two values of the modulation-demodulation phase shift, since light intensity integrations contributing pixel values to each raw frame generally are two-phase integrations. For example, a raw frame integrated partly at 90° phase shift and partly at 180° phase shift may be labeled a "90° frame" or a "90°/180° frame". For simplicity, let us use the labeling with one phase. A 90° raw frame, captured as the 4th frame in the 7-frame sequence, 180°, 270°, 0°, 90°, 180°, 270°, 0°, can be used to compute depth in combination with the 3 preceding frames (180°, 270°, and 0°), the 2 preceding and one following frame, and so on. There are in total 4 series of consecutive raw frames that include the 4th frame and can be used to compute depth frames. The depth imaging device may compute depth frames from all of the series, if required to maintain depth frame rate equal to the raw frame rate. It may use every other series, i.e. use every raw frame in two depth frame computations, if required to produce depth frames at half the raw frame rate. Finally, the device may use every captured raw frame in only one depth frame computation, and maintain the depth frame rate at ¼ of the raw frame rate. In each of the 4 raw frame series under discussion, the order of modulation-demodulation phase shifts is different: 180°, 270°, 0°, 90° in the first series, 270°, 0°, 90°, 180° in the second, and so on.

If there is an object in the device's field of view that moves at a constant speed toward or way from the device, the computation of a depth frame from each of the 4 series yields a slightly different set of measured distances to the object. Some of the differences between these sets accurately reflect the movement of the object in the time the 7-frame sequence was captured. But there are also differences caused only by the different ordering of phases in the 4 raw frame series used to compute depth frames. These differences create the appearance that the speed of the object's movement oscillates in time, at a frequency equal to $1/4^{th}$ of the raw frame frequency. In other words, the object appears to repeatedly accelerate and then slow down or even reverse its movement toward or away from the device, even though the actual speed of the movement is constant. This apparent object speed oscillation may be also perceived as an oscillation or pulsing of the surface of the object as it moves at a constant speed.

Regardless of how it is perceived, the phenomenon is nothing but an artifact produced by sequential sampling of light intensity at different phases of its modulation, and therefore its presence is undesirable. It is absent from all the sequences of depth frames computed without reusing raw frames or, more precisely, without changing the order of modulation-demodulation phase shifts from one depth frame computation to the next. Avoiding such changes is often the best choice, but if reusing raw frames is necessary to achieve a desired depth frame rate in a T-O-F depth imaging device, the device may use a method to suppress the motion-induced depth oscillation artifacts involving weighted averaging of pairs of consecutive raw frames with the same modulation-demodulation phase shift. The purpose of this raw frame averaging, which can be done in several ways, is to generate input for depth computations that looks less like a product sequential sampling of light intensity at different modulation phases, and more like a product of sampling done at all phases in parallel. When this "enhanced-coincidence input" is used instead of raw frames to compute depth images of moving objects, the result is a reduction of motion-induced depth oscillation artifacts, since they are a by-product of the sequential capture of the raw frames.

In embodiments, a T-O-F depth imaging device includes a subsystem performing when needed the weighted raw frame averaging described in the previous section. The subsystem is capable of acquiring from the device's light-sensing pixel array and storing in some type of internal memory multiple raw frames that need to be averaged. The subsystem also has storage capacity for the weights used in the averaging, and the frames produced by the averaging. The subsystem can output the latter to a depth-computing subsystem, to be used in depth frame computations, in lieu of raw frames coming from the device's light-sensing pixel array. Alternatively, these raw frames may be fed directly to the depth-computing subsystem, bypassing the raw frame averaging subsystem.

Pixel array 2010 can have depth pixels that are configured to sense portions of the emitted light 2016 that is reflected from object 2001 back towards housing 2002 and through opening 2004. The sensing can be subject to an effect of the demodulation signal, as mentioned above. The depth pixels can be further configured to generate at least first, second, and third raw data frames responsive to thus sensing the portions of the light that has been emitted subject to respectively the first, the second, and the third driver phase differences. It is the light emitted under these driver phase differences that can give rise to sensing the raw data frames at the different phases, which enable the T-O-F depth imaging. These raw data frames can be further processed by a processor (not shown in FIG. 20) as described below.

Figure 21:
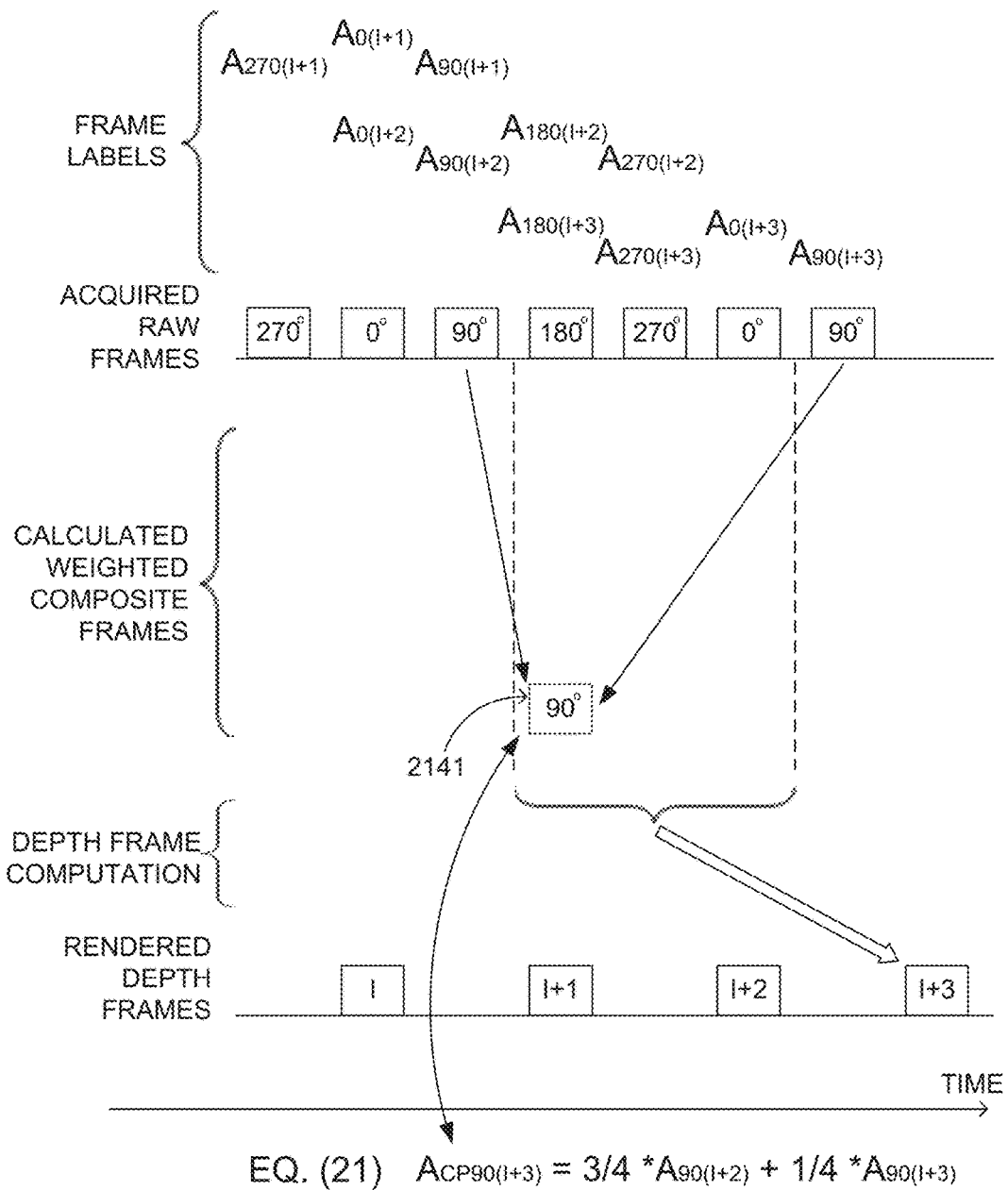
FIG. 21 is a diagram for implementing corrections to T-O-F depth image frames according to a first embodiment.

FIG. 21 is a diagram for implementing corrections to T-O-F depth image frames according to a first embodiment. FIG. 21 is a timing diagram showing a sequence of depth frames rendered by computation from a sequence of acquired raw frames. Frame labels are shown above the acquired raw frames, which may apply to these raw frames. It will be understood that each raw frame might have more than one label, which may be based on which rendered frame the raw frame contributes at the time. In this example, first, second, third and fourth raw data frames can be suitably selected among those for 0°, 90°, 180° and 270°.

As can be seen, a processor can be configured to calculate a composite first frame $A_{CP90(I+3)}$ 2141 for 90°. Calculation may happen, for example, as seen in Equation 21. The calculation provides an average for two raw phase data frames at 90°. The average may be weighted evenly, or favoring one of the constituent raw data frames, as long as there are nonzero contributions from at least two of the first raw data frames of $A_{90}$.

The processor can be further configured to compute an aggregate image i+3 from the composite first data frame 2141 plus at least one of the third raw data frames. The computed aggregate image i+3 can be rendered as the depth image of the object. In this case, the aggregate image is computed also from at least one of the second raw data frames, and in fact also from a fourth raw data frame. This is called a coincidence correction, and can work best when the change in illumination is substantially linear.

FIG. 21 is an example where a single composite data frame was computed, and three raw data frames were used, for the rendered depth frame i+3. The averaging contributes to smoothing from frame to frame, and can therefore ameliorate blinking in this 2-tap mode. If bandwidth permits more extensive computations, additional composite frames may be computed, as is now described.

Figure 22:
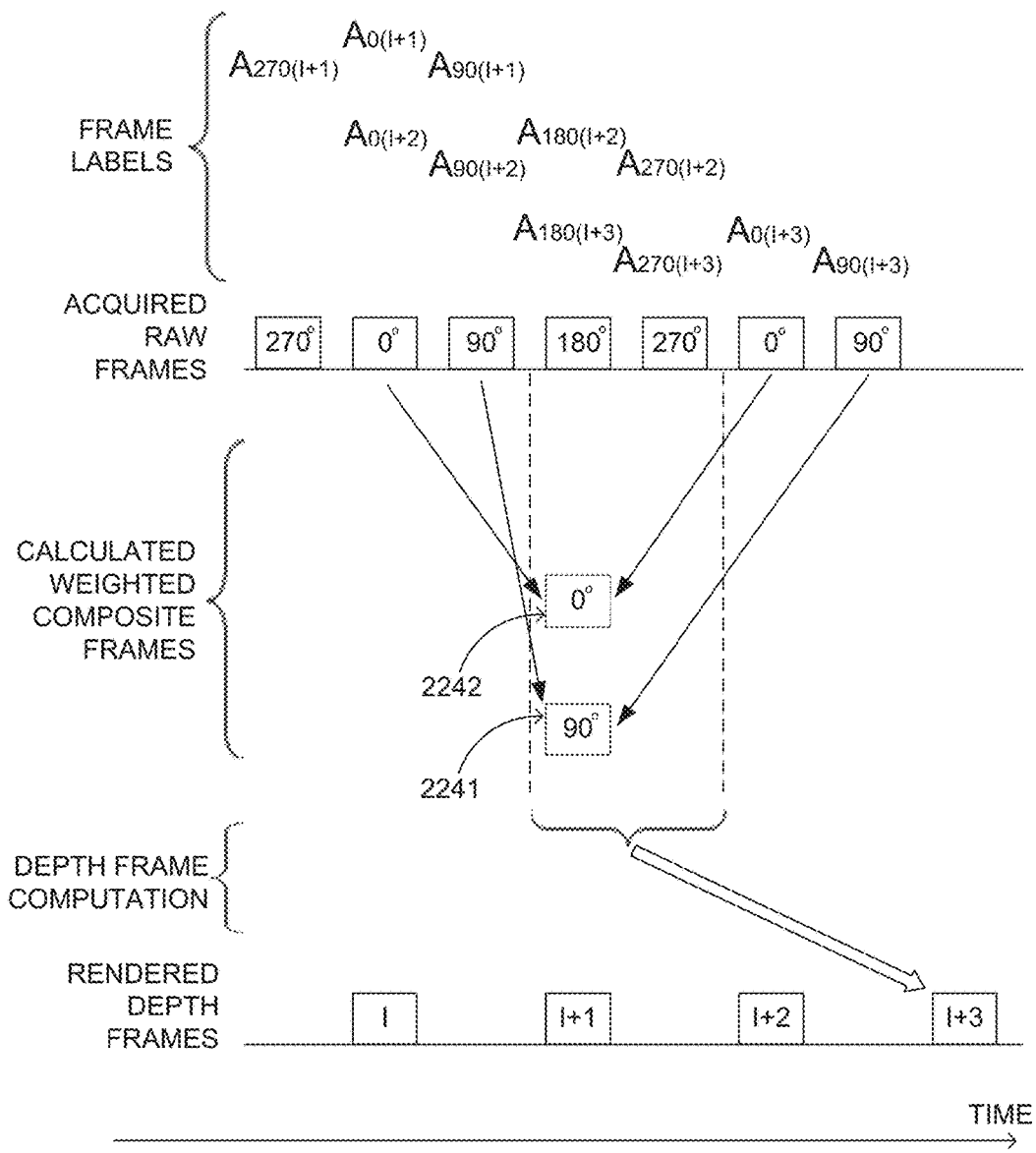
FIG. 22 is a diagram for implementing corrections to T-O-F depth image frames according to a second embodiment.

FIG. 22 is a diagram for implementing corrections to T-O-F depth image frames according to a second embodiment. It will be recognized that here the processor calculates both a composite first frame 2241 and also a composite second frame 2242. The aggregate image is computed also from the composite second frame 2242, and fewer pure raw frames.

Figure 23:
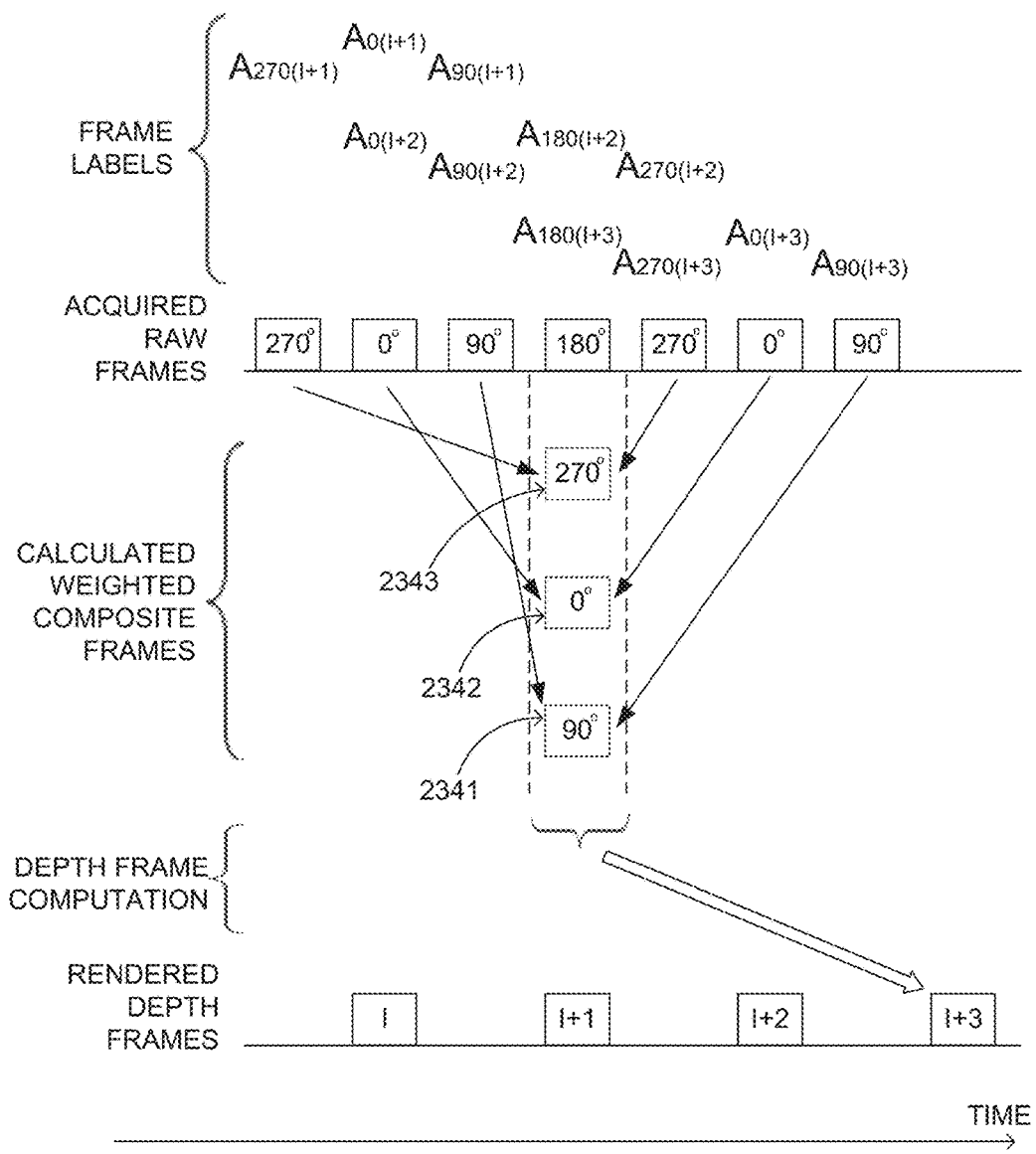
FIG. 23 is a diagram for implementing corrections to T-O-F depth image frames according to a third embodiment.

FIG. 23 is a diagram for implementing corrections to T-O-F depth image frames according to a third embodiment. It will be recognized that here the processor calculates a composite first frame 2341, a composite second frame 2342, and also a composite third frame 2343. The aggregate image is computed from these three composite frames, and only one pure raw frame, but requires more calculations.

FIG. 24 is a table of frame labels that may be used according to embodiments.

FIG. 25 shows a flowchart 2500 for describing methods according to embodiments. The methods of flowchart 2500 may be implemented by embodiments.

According to an operation 2510, an illumination clock signal is generated. The illumination clock signal can be modulated at an operating frequency.

According to another operation 2520, light can be emitted by a light source towards an object. The light can be emitted responsive to the illumination clock signal, and therefore modulated according to the illumination clock signal.

According to another operation 2530, a demodulation clock signal can be generated. The demodulation clock signal can be modulated at the operating frequency, and be configured to cause a sensitivity-modulation effect as described above. The demodulation clock signal may have one of at least a first, a second, and a third driver phase differences from the illumination clock signal.

According to another operation 2540, portions of the emitted light that is reflected from the object back towards the housing can be sensed. Sensing can be by the depth pixels, and be subject to the sensitivity-modulation effect.

According to another operation 2550, at least first, second, and third raw data frames can be generated, in response to thus sensing the portions of the light that are emitted subject to respectively the first, the second, and the third driver phase differences.

According to another operation 2560, a composite first frame may be calculated from nonzero contributions of two of the first raw data frames.

According to another operation 2570, an aggregate image may be computed from the composite first frame plus at least one of the third raw data frames.

According to another operation 2580, the computed aggregate image may be rendered as the depth image of the object.

In the methods described above, each operation can be performed as an affirmative step of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

A person skilled in the art will be able to practice the present invention in view of this description, which is to be taken as a whole. Details have been included to provide a thorough understanding. In other instances, well-known aspects have not been described, in order to not obscure unnecessarily this description. Plus, any reference to any prior art in this description is not, and should not be taken as, an acknowledgement or any form of suggestion that such prior art forms parts of the common general knowledge in any country or any art.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In this document, the phrases "constructed to" and/or "configured to" denote one or more actual states of construction and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Any and all parent, grandparent, great-grandparent, etc. patent applications, whether mentioned in this document or in an Application Data Sheet (ADS) of this patent application, are hereby incorporated by reference herein, including any priority claims made in those applications and any material incorporated by reference, to the extent such subject matter is not inconsistent herewith.

In this description a single reference numeral may be used consistently to denote a single aspect, component, or process. Moreover, a further effort may have been made in the drafting of this description to choose similar though not identical reference numerals to denote versions or embodiments of an aspect, component or process that are the same or possibly different. Where made, such a further effort was not required, but was nevertheless made gratuitously to accelerate comprehension by the reader. Even where made in this document, such an effort might not have been made completely consistently throughout the many versions or embodiments that are made possible by this description. Accordingly, the description controls. Any similarity in reference numerals may be used to confirm a similarity in the text, or even possibly a similarity where express text is absent, but not to confuse aspects where the text or the context indicates otherwise.

The claims of this document define certain combinations and subcombinations of elements, features and steps or operations, which are regarded as novel and non-obvious. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that it can have one or more of this component or item.

What is claimed is:

1. A T-O-F depth imaging device configured to render a depth image of an object, comprising:
   a housing;
   a controller configured to generate an illumination clock signal that is modulated at an operating frequency and a shutter clock signal that is modulated at the operating frequency, the shutter clock signal having a driver phase difference from the illumination clock signal;
   a light source on the housing configured to emit light towards the object responsive to the illumination clock signal;
   an optical shutter configured to alternately open and close responsive to the shutter clock signal;
   a pixel array having a plurality of depth pixels arranged in a plurality of rows, a first one of the rows having at least a first depth pixel that senses, at least, a portion of the emitted light reflected from the object back towards the housing and further passes through the optical shutter while the optical shutter is open from a first time instant when the driver phase difference has a first angle value to a second time instant when the driver phase difference has a second angle value that is at least 25° different from the first angle value, the first depth pixel further configured to generate a first depth value based on the sensing of the portion of the emitted light; and a processor configured to:
  compute a first phase correction from an attribute of the first row, and
  compute an adjusted first depth value from the first depth value and the first phase correction, and
in which a depth image of the object is rendered that includes the adjusted first depth value.

2. The T-O-F depth imaging device of claim 1, in which the sensing between the first time instant and the second time instant is continuous.

3. The T-O-F depth imaging device of claim 1, in which the attribute includes a location of the first row relative to locations of the plurality of the rows.

4. The T-O-F depth imaging device of claim 1, in which the adjusted first depth value is computed by subtracting the first phase correction from the first depth value.

5. The T-O-F depth imaging device of claim 1, in which the first row includes additional depth pixels that are configured to sense the portion of the emitted light concurrently with the first depth pixel and to generate additional respective depth values responsive to the sensing,
the processor is further configured to compute additional adjusted depth values from the additional depth values and the first phase correction, and
the rendered depth image includes the additional adjusted depth values.

6. The T-O-F depth imaging device of claim 5, in which the additional adjusted depth values are computed by subtracting the first phase correction from the additional depth values.

7. The T-O-F depth imaging device of claim 1, in which a second one of the rows different from the first row has at least a second depth pixel configured to sense the portion of the emitted light, the second depth pixel configured to thus sense from a third time instant when the driver phase difference has the first angle value to a fourth time instant when the driver phase difference has the second angle value, the second depth pixel further configured to generate a second depth value responsive to the sensing,
the processor is further configured to compute a second phase correction from an attribute of the second row, the second phase correction different from the first phase correction,
the processor is further configured to compute an adjusted second depth value from the second depth value and the second phase correction, and
the rendered depth image includes the adjusted second depth value.

8. The T-O-F depth imaging device of claim 7, in which the attribute of the second row includes a location of the second row relative to locations of the plurality of the rows.

9. The T-O-F depth imaging device of claim 7, in which the adjusted second depth value is computed by subtracting the second phase correction from the second depth value.

10. The T-O-F depth imaging device of claim 7, in which the second row includes additional depth pixels that are configured to sense the portion of the emitted light concurrently with the second depth pixel and to generate additional respective depth values responsive to the sensing,
the processor is further configured to compute additional adjusted depth values from the additional depth values and the second phase correction, and
the rendered depth image includes the additional adjusted depth values.

11. The T-O-F depth imaging device of claim 10, in which the additional adjusted depth values are computed by subtracting the second phase correction from the additional depth values.

12. A method for a T-O-F depth imaging device to render a depth image of an object, the T-O-F depth imaging device including a housing, a controller, a processor, a light source on the housing, an optical shutter, and a pixel array having a plurality of depth pixels arranged in a plurality of rows, a first one of the rows having at least a first depth pixel, the method comprising:
  generating an illumination clock signal that is modulated at an operating frequency;
  emitting, by the light source, light towards the object responsive to the illumination clock signal;
  generating a shutter clock signal that is modulated at the operating frequency, the shutter clock signal having a driver phase difference from the illumination clock signal;
  alternately opening and closing the optical shutter responsive to the shutter clock signal;
  sensing, by the first depth pixel, a portion of the emitted light that is reflected from the object back towards the housing and further passes through the optical shutter while the optical shutter is open, the first depth pixel thus sensing from a first time instant when the driver phase difference has a first angle value to a second time instant when the driver phase difference has a second angle value that is at least 25° different from the first angle value,
  generating, by the first depth pixel, a first depth value responsive to the sensing;
  computing a first phase correction from an attribute of the first row;
  computing an adjusted first depth value from the first depth value and the first phase correction; and
  rendering a depth image of the object that includes the adjusted first depth value.

13. The method of claim 12, in which the sensing between the first time instant and the second time instant is continuous.

14. The method of claim 12, in which the attribute includes a location of the first row relative to locations of the plurality of the rows.

15. The method of claim 12, in which the adjusted first depth value is computed by subtracting the first phase correction from the first depth value.

16. The method of claim 12, in which the first row includes additional depth pixels that are configured to sense the portion of the emitted light concurrently with the first depth pixel and to generate additional respective depth values responsive to the sensing,
the processor is configured to compute additional adjusted depth values from the additional depth values and the first phase correction, and the rendered depth image includes the additional adjusted depth values.

17. The method of claim 16, in which
the additional adjusted depth values are computed by subtracting the first phase correction from the additional depth values.

18. The method of claim 12, in which
a second one of the rows different from the first row has at least a second depth pixel configured to sense the portion of the emitted light, the second depth pixel configured to thus sense from a third time instant when the driver phase difference has the first angle value to a fourth time instant when the driver phase difference has the second angle value, the second depth pixel further configured to generate a second depth value responsive to the sensing,
the processor is configured to compute a second phase correction from an attribute of the second row, the second phase correction different from the first phase correction,
the processor is further configured to compute an adjusted second depth value from the second depth value and the second phase correction, and
the rendered depth image includes the adjusted second depth value.

19. The method of claim 18, in which
the attribute of the second row includes a location of the second row relative to locations of the plurality of the rows.

20. The method of claim 18, in which
the adjusted second depth value is computed by subtracting the second phase correction from the second depth value.

21. The method of claim 18, in which
the second row includes additional depth pixels that are configured to sense the portion of the emitted light concurrently with the second depth pixel and to generate additional respective depth values responsive to the sensing,
the processor is further configured to compute additional adjusted depth values from the additional depth values and the second phase correction, and
the rendered depth image includes the additional adjusted depth values.

22. The method of claim 21, in which
the additional adjusted depth values are computed by subtracting the second phase correction from the additional depth values.

* * * * *